US012221921B1

(12) United States Patent
Blank et al.

(10) Patent No.: US 12,221,921 B1
(45) **Date of Patent: *Feb. 11, 2025**

(54) OUTBOARD ENGINE ASSEMBLY

(71) Applicant: BRP US INC., Sturtevant, WI (US)

(72) Inventors: Nathan Blank, Burlington, WI (US); Roger Raetzman, Pleasant Prairie, WI (US)

(73) Assignee: BRP US Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/331,346

(22) Filed: Jun. 8, 2023

Related U.S. Application Data

(63) Continuation of application No. 17/730,876, filed on Apr. 27, 2022, now Pat. No. 11,708,788, and a continuation-in-part of application No. 17/164,250, filed on Feb. 1, 2021, now Pat. No. 11,655,784.

(60) Provisional application No. 63/180,310, filed on Apr. 27, 2021, provisional application No. 62/968,855, filed on Jan. 31, 2020.

(51) Int. Cl.

| | |
|---|---|
| ***F02B 61/04*** | (2006.01) |
| ***F01N 13/00*** | (2010.01) |
| ***F01N 13/12*** | (2010.01) |
| ***F02B 75/02*** | (2006.01) |

(52) U.S. Cl.
CPC .......... *F02B 61/045* (2013.01); *F01N 13/004* (2013.01); *F01N 13/12* (2013.01); *F01N 2590/021* (2013.01); *F02B 2075/027* (2013.01)

(58) Field of Classification Search
CPC .............. F02B 61/045; F02B 2075/027; F01N 13/004; F01N 13/12; F01N 2590/021
See application file for complete search history.

(56) References Cited

U.S. PATENT DOCUMENTS

| | | | |
|---|---|---|---|
| 2,207,372 | A | 7/1940 | Clarke |
| 2,216,496 | A | 10/1940 | Mackay |
| 3,164,122 | A | 1/1965 | Morris |
| 3,452,704 | A | 6/1969 | Cothron |
| 3,911,853 | A | 10/1975 | Strang |
| 4,178,873 | A | 12/1979 | Bankstahl |
| 4,559,018 | A | 12/1985 | Harada et al. |
| 4,726,799 | A | 2/1988 | Harada et al. |
| 4,773,215 | A | 9/1988 | Litjens et al. |
| 5,344,350 | A | 9/1994 | Hatch |
| 5,472,361 | A | 12/1995 | Fujimoto et al. |

(Continued)

*Primary Examiner* — Jacob M Amick
*Assistant Examiner* — Charles J Brauch
(74) *Attorney, Agent, or Firm* — BCF LLP

(57) ABSTRACT

An outboard engine assembly has an engine unit including an engine unit housing, an internal combustion engine disposed in the engine unit housing, the engine defining at least one combustion chamber, an exhaust system fluidly communicating with the at least one combustion chamber for supplying exhaust gases from the at least one combustion chamber to an exterior of the outboard engine assembly, a gearcase connected to the engine unit housing, a control module connected to the engine for controlling at least one operating parameter of the outboard engine assembly, and a water sensor disposed at least in part in the exhaust system for detecting presence of water in the exhaust system, the water sensor being in communication with the control module, and a propulsion device operatively connected to the engine.

20 Claims, 23 Drawing Sheets

(56) References Cited

U.S. PATENT DOCUMENTS

| | | | | |
|---|---|---|---|---|
| 5,554,057 | A * | 9/1996 | Abe | B63H 20/245 440/89 R |
| 5,996,734 | A | 12/1999 | Blanchard et al. | |
| 7,510,451 | B2 | 3/2009 | Inaba | |
| 7,736,206 | B1 | 6/2010 | Mcchesney et al. | |
| 9,499,247 | B1 | 11/2016 | Wiatrowski | |
| 2019/0233073 | A1 | 8/2019 | Wiatrowski | |

* cited by examiner

OUTBOARD ENGINE ASSEMBLY

CROSS-REFERENCE

The present application is a continuation of U.S. patent application Ser. No. 17/730,876, filed Apr. 27, 2022 entitled "Outboard Engine Assembly" which claims priority to U.S. Provisional Patent Application No. 63/180,310, filed Apr. 27, 2021 entitled "Outboard Engine Assembly" and is a continuation-in-part of U.S. Pat. No. 11,655,784, granted May 23, 2023 entitled "Marine Engine Assembly Having an Air Pump" which claims priority to U.S. Provisional Patent Application No. 62/968,855, filed Jan. 31, 2020 entitled "Marine Engine Assembly Having an Air Pump", the entirety of each of which is incorporated herein by reference.

TECHNICAL FIELD

The present technology relates to outboard engine assemblies and more specifically water intrusion prevention in internal combustion engines of outboard engine assemblies.

BACKGROUND

A typical outboard engine assembly is formed from an engine unit with an internal combustion engine, a lower unit with a propeller, and a midsection connecting the engine to the propeller. The midsection also has an exhaust channel to bring exhaust from the engine to be expelled out through the lower unit.

The outboard engine assembly is generally connected to its corresponding watercraft by a transom or mounting bracket, typically connected to the midsection, below the engine unit. The bracket connects to a rear portion of the watercraft, such that the engine unit and part of the midsection is well above the water. In some cases, however, it could be preferable to have an outboard engine which is disposed lower relative to the watercraft to allow more useable room in the watercraft for example.

However, by positioning the outboard engine lower, a portion of the engine unit, and therefore the engine, will likely be below the water level at least some of the time, risking water intrusion in the engine. When the engine is operating, the flow of exhaust gases out of the outboard engine is usually sufficient to prevent water intrusion into the engine via the exhaust system. However, when the engine is stopped, the flow of exhaust gases stops, and the risk of water entering the exhaust system, and potentially the engine under some circumstances, is greater.

Therefore, there is a desire for an outboard engine assembly having features assisting in the prevention of water intrusion in the engine.

SUMMARY

It is an object of the present technology to ameliorate at least some of the inconveniences present in the prior art.

According to one aspect of the present technology, there is provided an outboard engine assembly for a watercraft having an engine unit including an engine unit housing, an internal combustion engine disposed in the engine unit housing, the engine defining at least one combustion chamber, an exhaust system fluidly communicating with the at least one combustion chamber for supplying exhaust gases from the at least one combustion chamber to an exterior of the outboard engine assembly, a gearcase connected to the engine unit housing, a control module connected to the engine for controlling at least one operating parameter of the outboard engine assembly, a water sensor disposed at least in part in the exhaust system for detecting presence of water in the exhaust system, the water sensor being in communication with the control module, and a propulsion device operatively connected to the engine.

In some implementations, the outboard engine assembly further includes a cooling water conduit having a cooling water conduit outlet fluidly communicating with the exhaust system for supplying water into the exhaust system, the cooling water conduit outlet being positioned such that water exiting the cooling water conduit outlet flows across the water sensor.

In some implementations, the exhaust system defines an exhaust outlet fluidly communicating with the gearcase.

In some implementations, the exhaust outlet is defined in the propulsion device.

In some implementations, the exhaust system defines a high rise exhaust passage, and the water sensor is disposed between the exhaust outlet and an apex of the high rise exhaust passage In some implementations, the water sensor is disposed between the apex of the high rise exhaust passage and an outlet of the high rise exhaust passage.

In some implementations, the water exiting the cooling water conduit flows into the high rise exhaust passage and then to the exhaust outlet.

In some implementations, the engine unit housing includes an outer housing and an inner housing disposed in the outer housing, and the inner housing defines the high rise exhaust passage.

In some implementations, the outboard engine assembly further includes a cooling system including at least one water intake defined in the gearcase, a water pump housed in at least one of the gearcase and the inner housing, the water pump having an inlet in fluid communication with the at least one water intake and an outlet, and the cooling water conduit being in fluid communication with the outlet of the water pump.

In some implementations, the cooling water conduit is in fluid communication with cooling water passages supplying cooling water from the outlet of the pump to at least one of an engine block of the internal combustion engine and a cylinder head of the internal combustion engine.

In some implementations, the cooling system further includes intermediate cooling water conduits in fluid communication with the outlet of the pump for providing cooling water to at least one of the control module, a fuel injector assembly, a vapor separator assembly and a power steering system of the outboard engine assembly before supplying cooling water to the cooling water conduit and then to the cooling water conduit outlet.

In some implementations, the cooling system further includes an exhaust water jacket defined in the inner housing and being in fluid communication with the outlet of the water pump, the exhaust water jacket surrounding at least a portion of the high rise exhaust passage.

In some implementations, the inner housing forms a pocket in the high rise exhaust passage, the inner housing further forms a sensor passage, the sensor passage communicates with the pocket, and the water sensor extends at least partially in the sensor passage.

In some implementations, the cooling water conduit outlet is defined within the pocket, and the water exiting the cooling water conduit outlet flows in the pocket between the water sensor and the high rise exhaust passage.

In some implementations, the pocket defines a first outlet disposed above the cooling water conduit outlet, and a second outlet disposed below the cooling water conduit outlet, the water sensor being disposed below the first outlet.

In some implementations, the water sensor is disposed above the cooling water conduit outlet.

In some implementations, the water sensor includes a plurality of probes for detecting the presence of water in the high rise exhaust passage, and a sensor housing connected to the inner housing, the sensor housing including shrouds disposed around the plurality of probes.

In some implementations, the exhaust system defines a high rise exhaust passage and an exhaust outlet fluidly communicating with the gearcase, the water sensor being disposed between the exhaust outlet and an apex of the high rise exhaust passage, and the water exiting the cooling water conduit flowing into the high rise exhaust passage and then to the exhaust outlet.

In some implementations, the outboard engine assembly further includes a cooling system including at least one water intake defined in the gearcase, a water pump housed in at least one of the gearcase and the engine unit housing, the water pump having an inlet in fluid communication with the at least one water intake and an outlet, and the cooling water conduit being in fluid communication with the outlet of the water pump.

In some implementations, the cooling water conduit is in fluid communication with cooling water passages supplying cooling water from the outlet of the water pump to at least one of an engine block of the internal combustion engine and a cylinder head of the internal combustion engine.

In some implementations, the cooling system further includes intermediate cooling water conduits fluidly communicating with the outlet of the pump for providing cooling water to at least one of the control module, a fuel injector assembly, a vapor separator assembly and a power steering system of the outboard engine assembly before supplying cooling water to the cooling water conduit and on to the cooling water conduit outlet.

In some implementations, a pocket is formed in the high rise exhaust passage, the pocket defining a sensor passage, and the water sensor extends at least partially in the sensor passage.

In some implementations, the cooling water conduit outlet is defined within the pocket, and the water exiting the cooling water conduit outlet flows in the pocket between the water sensor and the high rise exhaust passage.

In some implementations, the pocket defines a first outlet disposed above the cooling water conduit outlet, and a second outlet disposed below the cooling water conduit outlet, the water sensor being disposed below the first outlet.

In some implementations, the water sensor is disposed above the cooling water conduit outlet.

In some implementations, the internal combustion engine further includes a crankshaft defining a crankshaft axis, the water sensor being disposed above the crankshaft axis.

In some implementations, the water sensor defines a water sensor axis, the water sensor axis being substantially parallel to the crankshaft axis.

In some implementations, the outboard engine assembly further includes a transom bracket connected to the engine unit housing. The transom bracket defines a tilt-trim axis, and a center of mass of the engine is disposed below the tilt-trim axis at least when the outboard engine assembly is in a trim range.

In some implementations, the outboard engine assembly further includes a transmission disposed in the gearcase, the transmission operatively connecting the engine to the propulsion device.

For purposes of this application, terms related to spatial orientation such as forward, rearward, upward, downward, left, and right, should be understood in a frame of reference of the outboard engine assembly, as it would be mounted to a watercraft with an outboard engine in a neutral trim position. Terms related to spatial orientation when describing or referring to components or sub-assemblies of the engine assembly separately therefrom should be understood as they would be understood when these components or sub-assemblies are mounted in the outboard engine assembly, unless specified otherwise in this application. The terms "upstream" and "downstream" should be understood with respect to the normal flow direction of fluid inside a component. As such, in an engine assembly, the air intake system is upstream of the engine and the exhaust system is downstream of the engine. Similarly, for a component having an inlet and an outlet, the inlet is upstream of the outlet, and the outlet is downstream of the inlet. The term "hermetically sealed" should be understood to mean that the passage of gas through the associated device is prevented, such as in an airtight manner.

Explanations and/or definitions of terms provided in the present application take precedence over explanations and/or definitions of these terms that may be found in any documents incorporated herein by reference.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology is described with reference to its use in an outboard engine assembly 100 that is used to propel a watercraft and is configured to be disposed under the deck of the watercraft it propels. It is contemplated that aspects of the present technology could be used in other types of outboard engine assemblies, such as in an outboard engines having an engine unit, a midsection connected below the engine unit, a lower unit connected below the midsection, and a transom bracket configured to connect the midsection to a watercraft.

Figure 1:
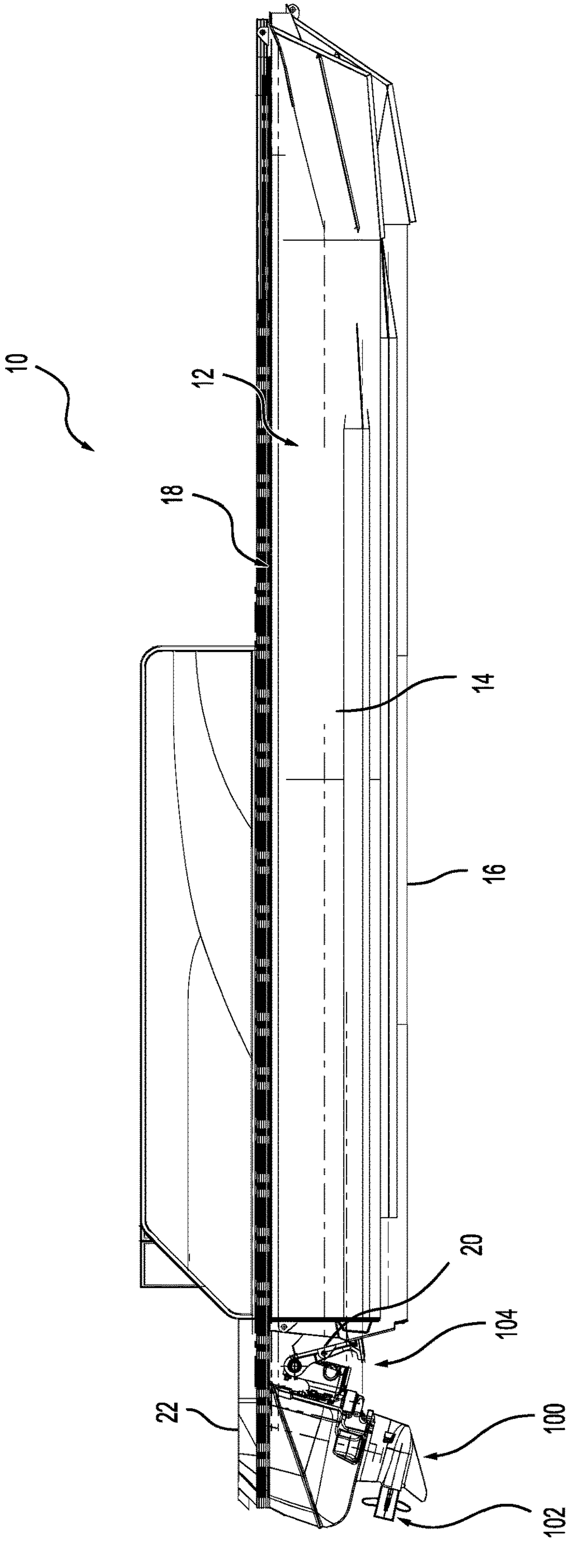
FIG. 1 is a right side elevation view of a watercraft having an outboard engine assembly according to the present technology.

In FIG. 1, a watercraft 10 is illustrated. The watercraft 10 is specifically a pontoon boat 10, but this is simply one non-limiting example of a watercraft according to the present technology. This particular embodiment of the boat 10 includes a watercraft body 12 formed generally from two pontoons 14 (only one being illustrated) and a platform 16.

The boat 10 also includes an outboard engine assembly 100, also referred to herein as the assembly 100. The assembly 100 is pivotably and rotatably connected to the watercraft body 12 for providing propulsion via a propulsion device 102. The propulsion device 102 is specifically a propeller 102 in the present embodiment, but it is contemplated that the propulsion device 102 could be different in some embodiments.

The assembly 100 includes a transom bracket 104 which is fastened to the watercraft body 12. As is shown schematically, the transom bracket 104 is connected to a lower portion of the platform 16, such that the assembly 100 is generally disposed below a top surface 18, also called the deck 18, of the platform 16 laterally between the pontoons 14.

With additional reference to FIGS. 2 to 6, the outboard engine assembly 100, shown separately from the watercraft 10, will now be described in more detail. The assembly 100 includes an engine unit 106, a lower unit 108, and the transom bracket 104.

The engine unit 106 includes an engine unit housing 110 for supporting and covering components disposed therein. The housing 110 is sealed such that water in which the engine unit housing 110 is immersed is impeded from entering the engine unit housing 110 during normal operating conditions, including when at rest, and components of the engine inside the housing 110 are water-proofed to the same degree as in a conventional outboard engine. Depending on the specific embodiment of the housing 110 and methods used to produce a generally water-tight seal, the housing 110 could be water-resistant to varying degrees. It is contemplated that the housing 110 could receive different treatments to seal the housing 110 depending on the specific application for which the outboard engine assembly 100 is going to be used. In the present embodiment, the housing 110 includes a cowling 112. The cowling 112 is fastened to the rest of the housing 110 along a diagonally extending parting line 112*a*. A seal 112*b* (FIG. 5) is provided between the cowling 112 and the rest of the housing 110 along the parting line 112*a*. The engine unit housing 110 includes an outer housing 113 and an inner housing 114. The inner housing 114 is disposed in the outer housing 113 and is therefore housed in a volume 113*a* (FIG. 3) defined between the cowling 112 and the outer housing 113.

Figure 5:
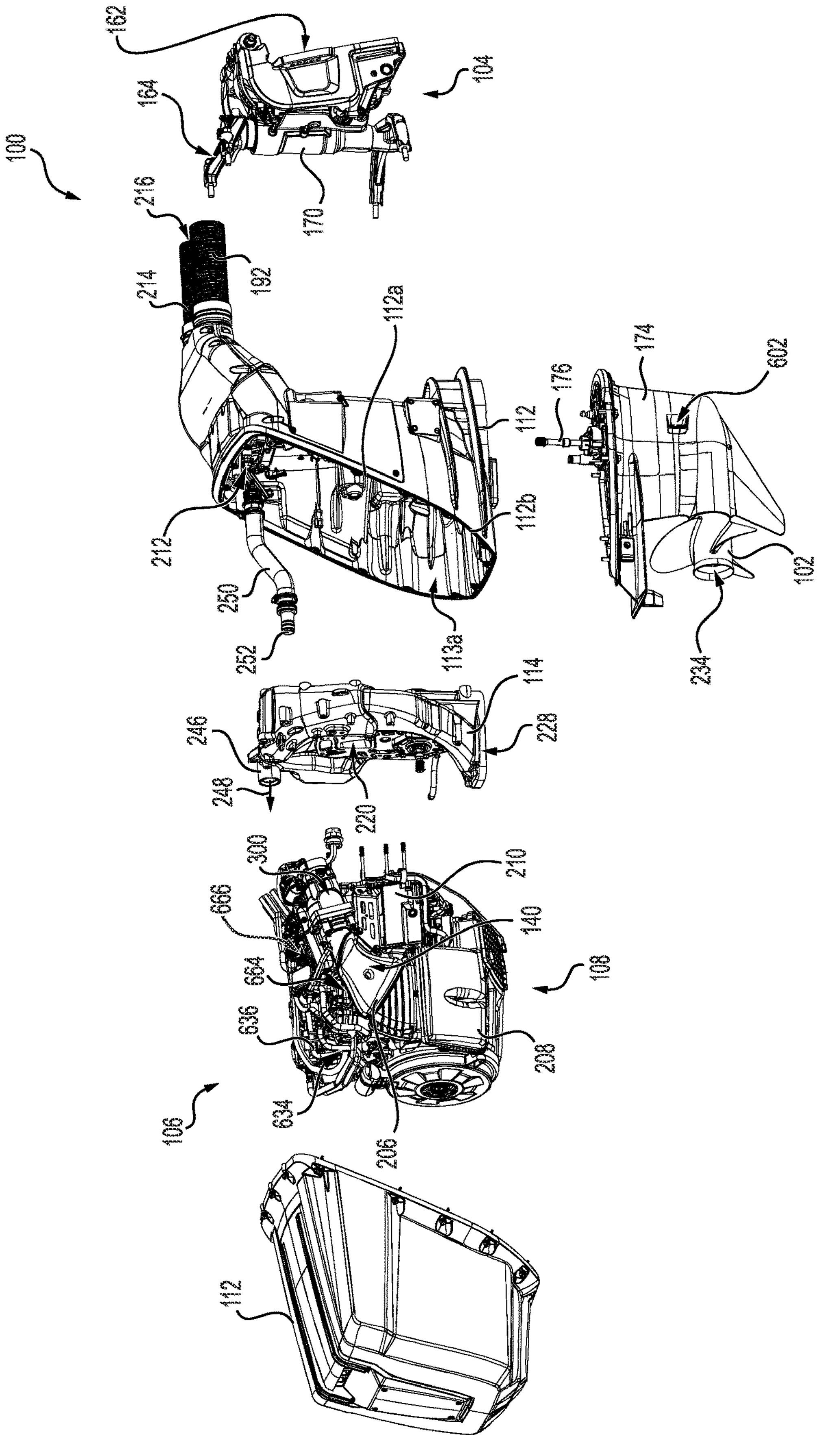
FIG. 5 is an exploded, perspective view taken from a top, rear, right side of the outboard engine assembly of FIG. 2.
Figure 6:
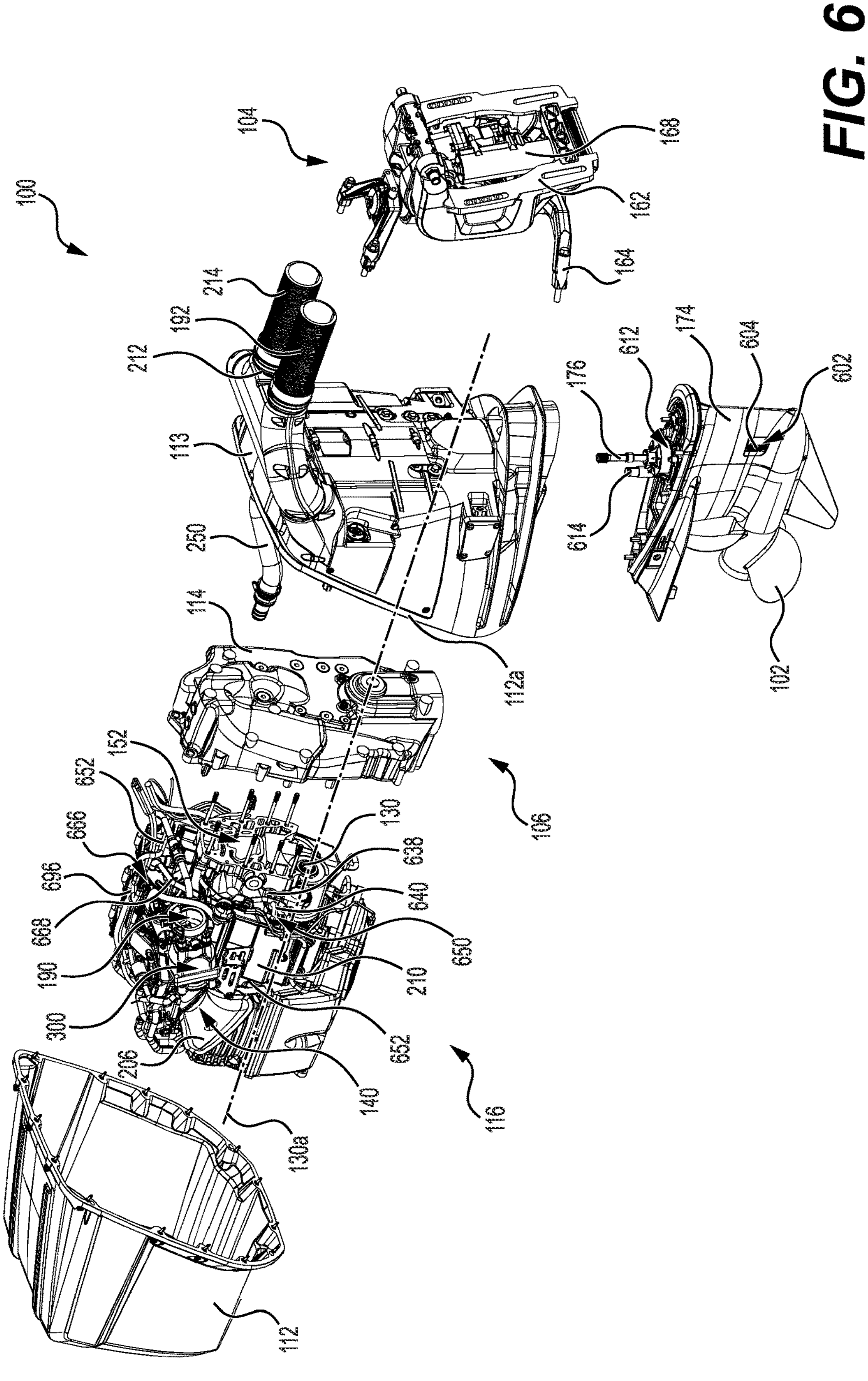
FIG. 6 is an exploded, perspective view taken from a top, front, right side of the components shown in FIG. 5.

The engine unit 106 includes an internal combustion engine 116 disposed in the engine unit housing 110 for powering the assembly 100 and for driving the propeller 102. By removing the cowling 112, the engine 116 can be accessed, as shown in FIGS. 5 and 6. In the present embodiment, the internal combustion engine 116 is a three-cylinder, two-stroke, gasoline-powered, direct injected internal combustion engine. It is contemplated that the internal combustion engine 116 could be a four-stroke internal combustion engine. It is contemplated that the engine 116 could have more or less than three cylinders. In some embodiments, the internal combustion engine 116 could use a fuel other than gasoline, such as diesel.

Figure 3:
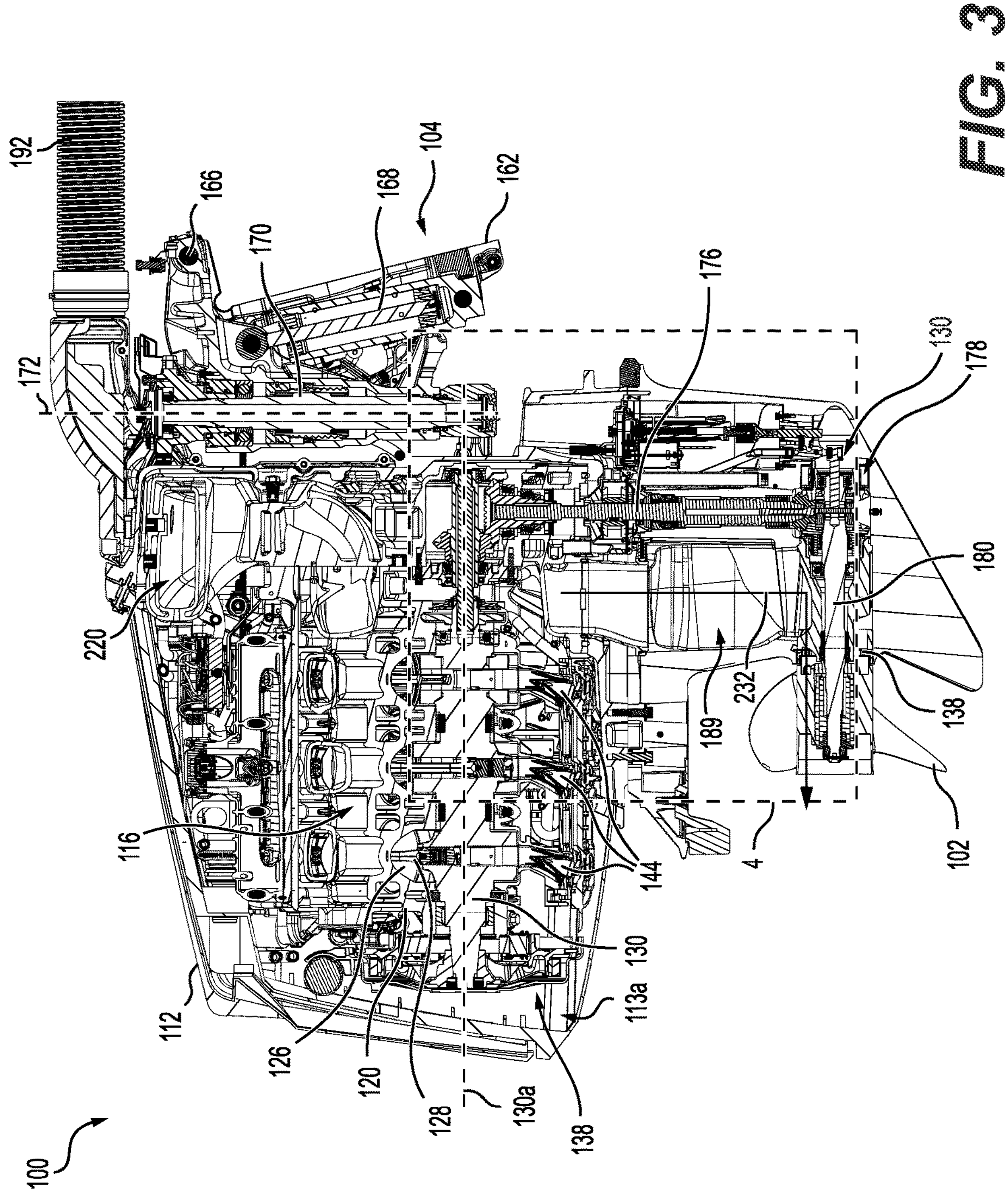
FIG. 3 is a vertical cross-sectional view of the outboard engine assembly of FIG. 2, the vertical cross-section being taken longitudinally along a lateral center of the outboard engine assembly.
Figure 4:
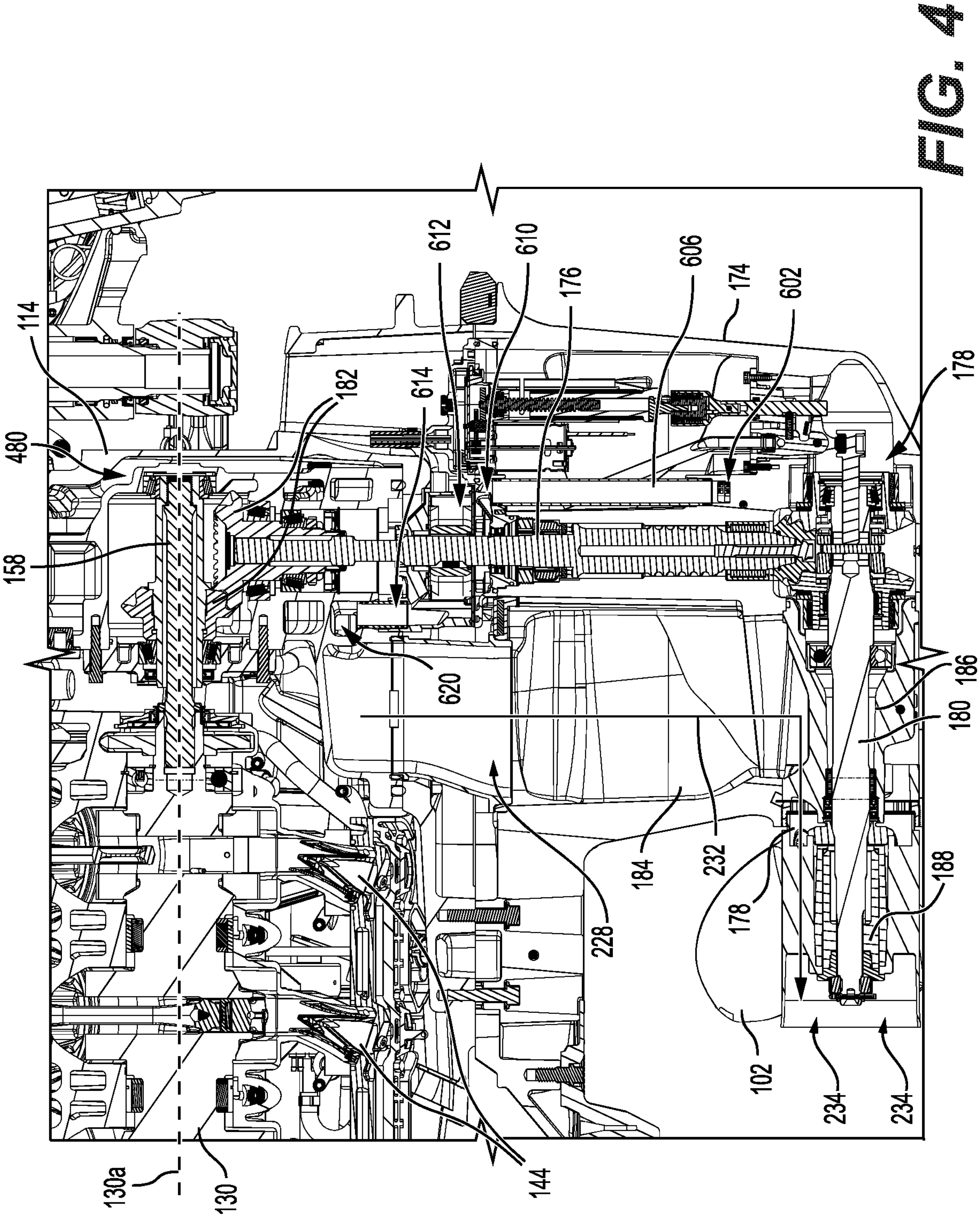
FIG. 4 is a close-up of portion 4 of FIG. 3.
Figure 7:
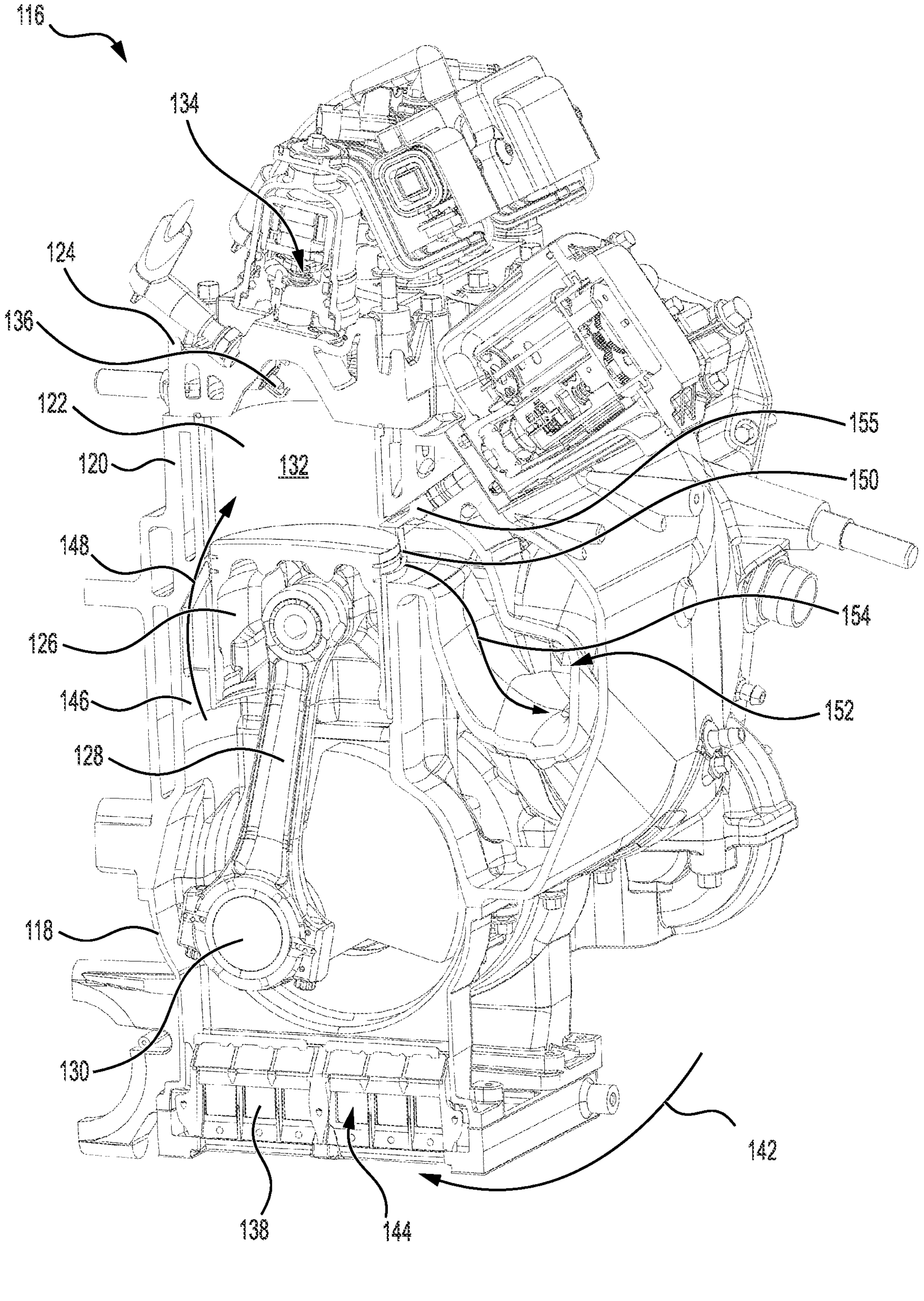
FIG. 7 is a perspective view, taken from a rear, right side of a vertical cross-section of an engine, an exhaust system and other components of the outboard engine assembly of FIG. 3, the vertical cross-section being taken laterally through a center of a middle cylinder of the engine.

With reference to FIG. 7, the engine 116 includes a crankcase 118. A cylinder block 120 defining three cylinders 122 (one of which is shown) is disposed above the crankcase 118. A cylinder head 124 is disposed on top of the cylinder block 120. Each cylinder 122 has a piston 126 reciprocally received inside of it. Each piston 126 is connected by a corresponding connecting rod 128 to a crankshaft 130. The crankshaft 130 rotates in the crankcase 118 about a crankshaft axis 130*a* (FIGS. 3 and 6). For each cylinder 122, the piston 126, the cylinder 122 and the cylinder head 124 define together a combustion chamber 132. For each combustion chamber 132, a direct fuel injector 134 supported by the cylinder head 124 is provided to inject fuel into the combustion chamber 132, and a spark plug 136 extends into the combustion chamber 132 through the cylinder head 124 to ignite an air-fuel mixture inside the combustion chamber 132.

The engine 116 includes one air intake 138 per cylinder 122. The air intakes 138 are provided at the bottom of the crankcase 118. Air is delivered to the air intakes 138 by an air intake assembly 140 (FIGS. 5 and 6), described in more detail below, as indicated by arrow 142. The air passes through reed valves 144 provided in the crankcase 118 adjacent the air intakes 138. The reed valves 144 allow air to enter the crankcase 118 but help prevent air from exiting the crankcase 118. For each cylinder 122, a transfer port 146 communicates the crankcase 118 with the corresponding combustion chamber 132 for air to be supplied to the combustion chamber 132 as indicated by arrow 148.

Figure 8:
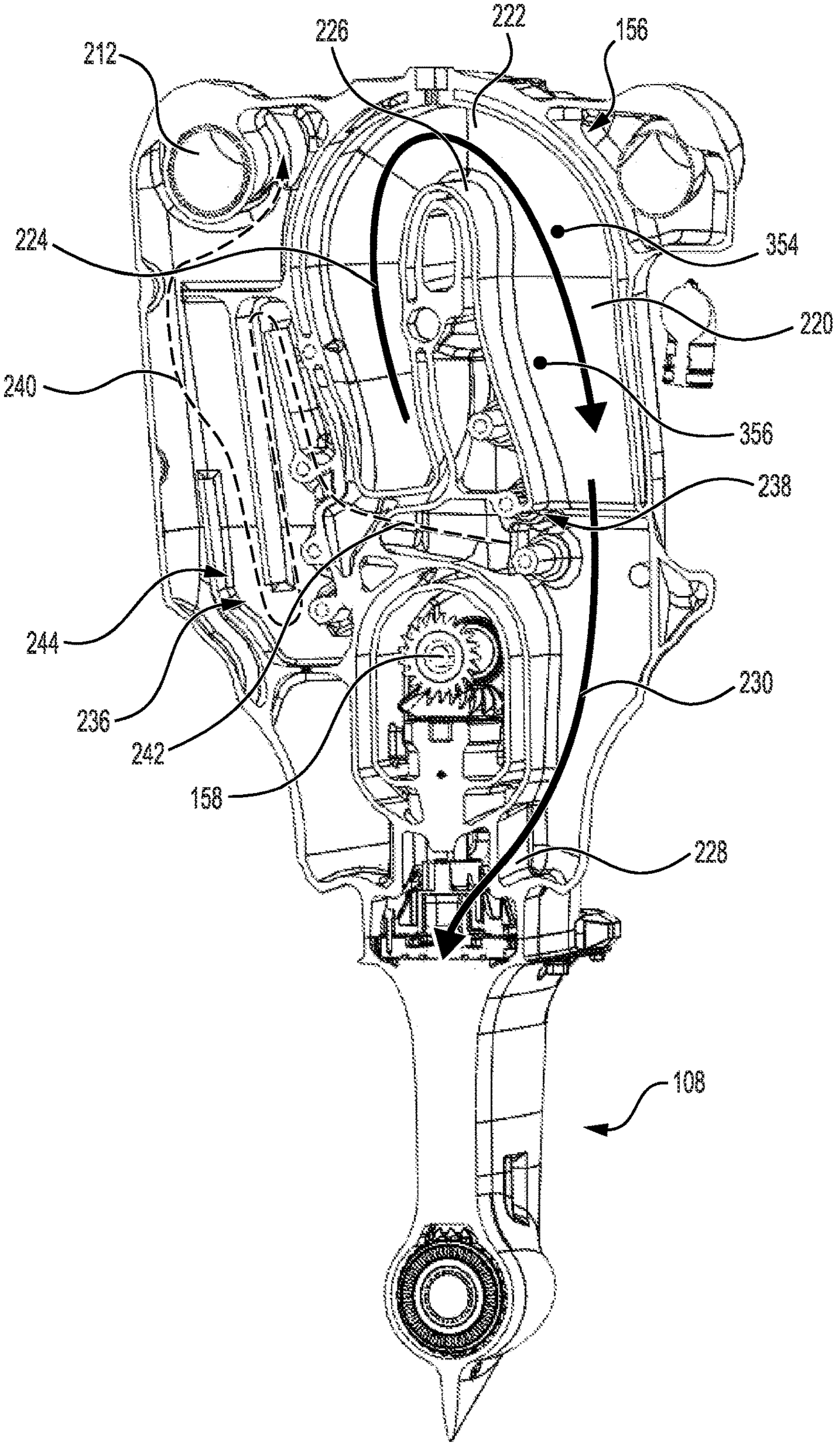
FIG. 8 is a perspective view, taken from a rear, right side of a vertical cross-section of the outboard engine assembly of FIG. 3, taken through line 8-8 of FIG. 2.
Figure 9:
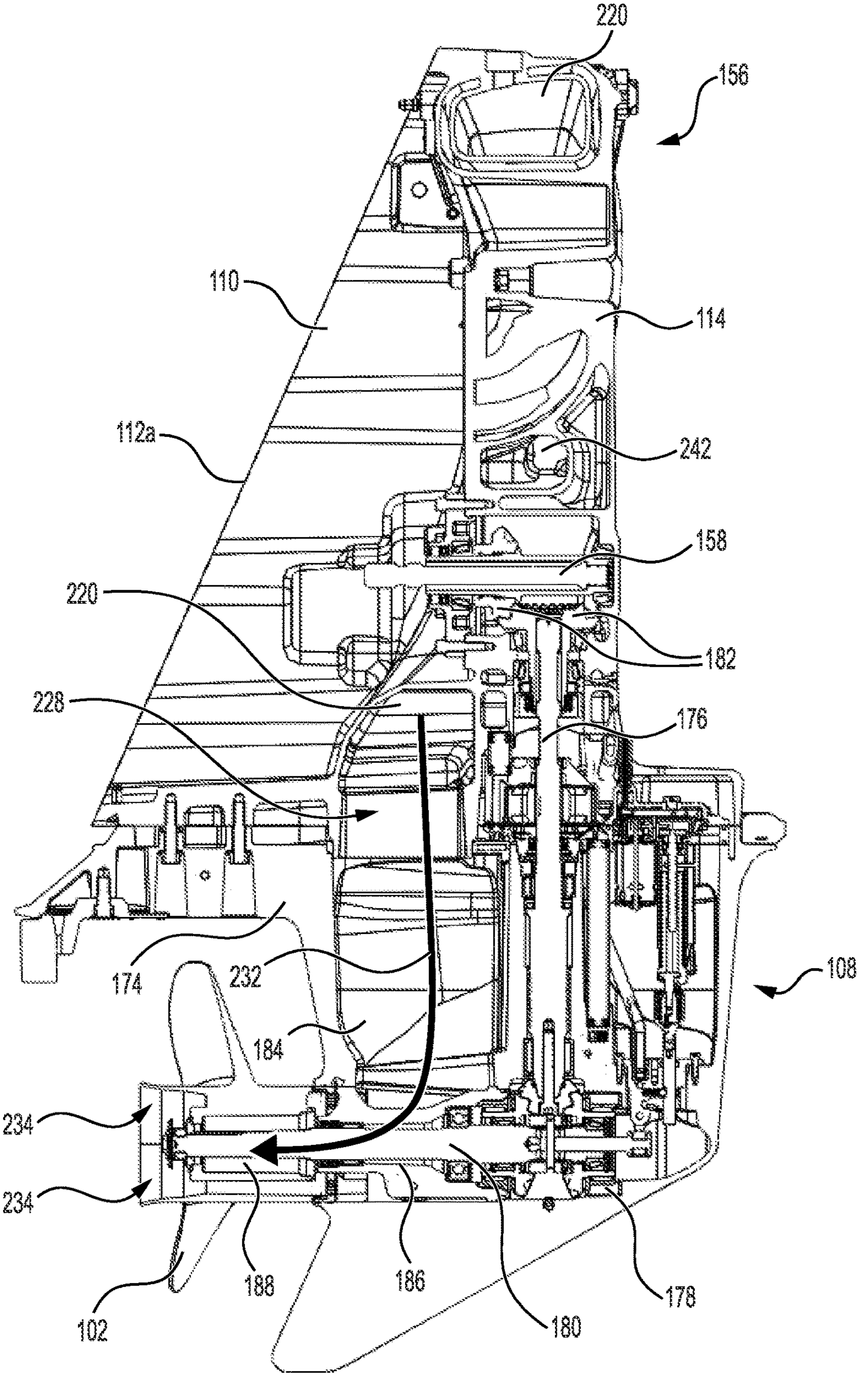
FIG. 9 is a vertical cross-section view of a front portion of the outboard engine assembly of FIG. 3, with the engine and some associated components having been removed, the vertical cross-section being taken longitudinally along a lateral center of the outboard engine assembly.
Figure 18:
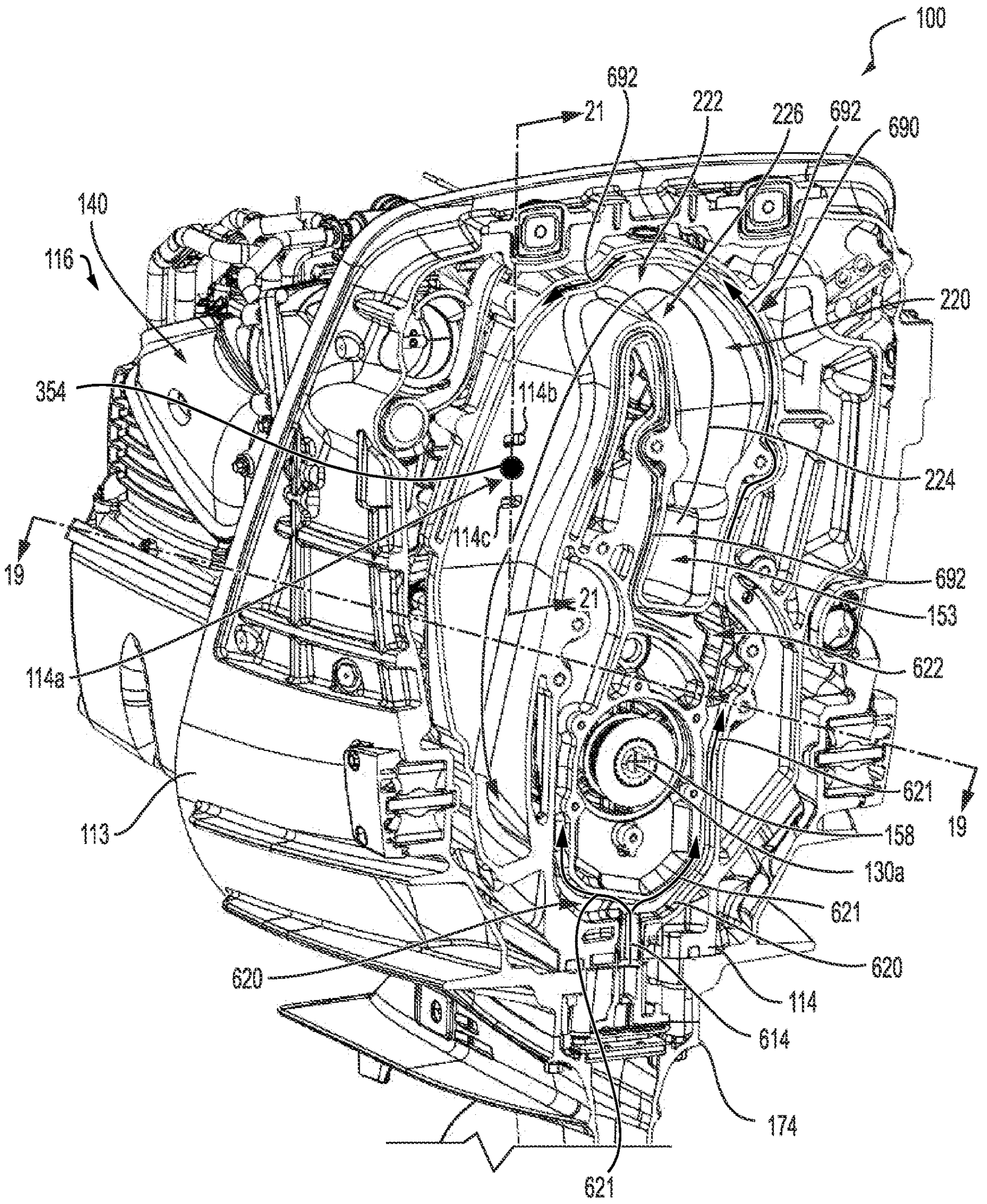
FIG. 18 is a perspective view taken from a top, front, right side of a cross-section of the outboard engine assembly of FIG. 2 taken through line 18-18 of FIG. 2, with a cowling of the engine unit housing omitted.

Each combustion chamber 132 has a corresponding exhaust port 150. Exhaust gases flow from the combustion chambers 132, through the exhaust ports 150, into an exhaust manifold 152 as indicated by arrow 154. Each exhaust port 150 has a corresponding reciprocating exhaust valve 155 that varies the effective cross-sectional area and timing of its exhaust port 150. From the exhaust manifold 152, the exhaust gases are routed out of the outboard engine assembly 100 via the other portions of an exhaust system 156 (some of which are shown in FIGS. 8, 9 and 18), described in more detail below.

Figure 2:
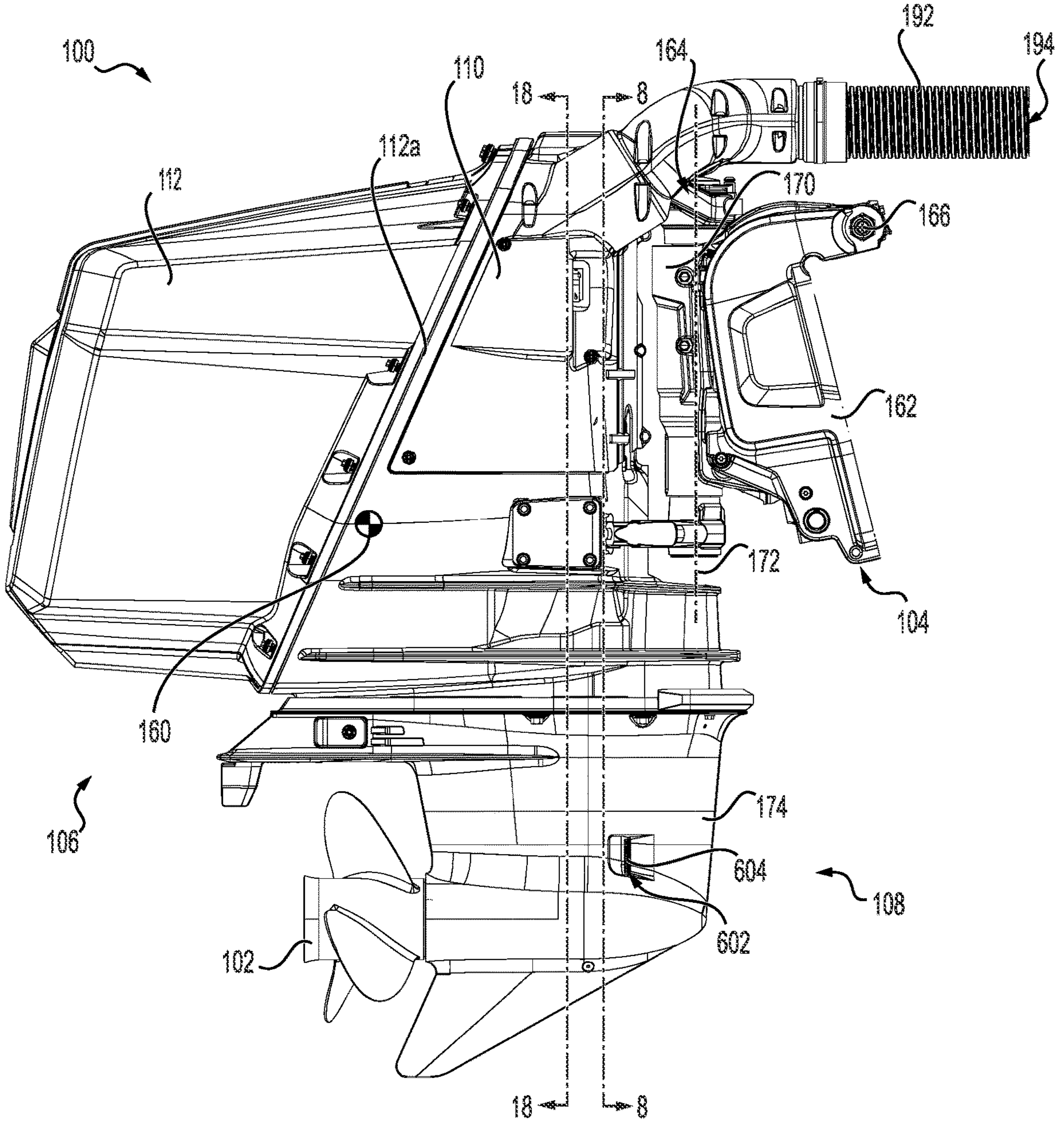
FIG. 2 is a right side elevation view of the outboard engine assembly of the watercraft of FIG. 1.

The reciprocation of the pistons 126 causes the crankshaft 130 to rotate. The crankshaft 130 drives an output shaft 158 (FIGS. 4, 8 and 9) which drives the propeller 102, as is described in more detail below. With reference to FIG. 2, a center of mass 160 of the engine 116 is disposed vertically in a lower half of the engine unit 110, and longitudinally about halfway along a length of the crankshaft 130, although the exact position of the center of mass 160 depends on the details of a particular embodiment of the engine 116.

Returning to FIGS. 2 to 6, the transom bracket 104 includes a watercraft portion 162 which is adapted for fastening to the watercraft body 12. The bracket 104 also includes an engine portion 164, pivotally connected to the watercraft portion 162, and which is fastened to the engine unit housing 110. The engine portion 164 is pivotable with respect to the watercraft portion 162 about a tilt-trim axis 166. The transom bracket 104 thus defines the tilt-trim axis 166 of the outboard engine assembly 100, about which the assembly 100 can be trimmed or tilted relative to the watercraft body 12. The engine portion 164 of the transom bracket 106 includes a tilt/trim actuator 168 (FIGS. 3 and 6) for tilting or trimming the assembly 100 relative to watercraft body 12. In one embodiment, the tilt/trim actuator 168 is a linear hydraulic actuator adapted for pushing the engine portion 164 away from the watercraft portion 162, but other types of tilt/trim actuators 168 are contemplated, such as those described in United States Patent Application Publication No. 2019/0233073 A1, published on Aug. 1, 2019 and entitled "Stern and Swivel Bracket Assembly For Mounting A Drive Unit to a Watercraft", U.S. Pat. No. 7,736,206 B1, issued on Jun. 15, 2010 and entitled "Integrated Tilt trim and Steering Subsystem For Marine Outboard Engines", and U.S. Pat. No. 9,499,247 B1, issued on Nov. 22, 2016 and entitled "Marine Outboard Engine Having A Tilt trim And Steering Bracket Assembly", the entirety of each of which is incorporated herein by reference. The engine portion 164 includes steering actuator 170 configured for steering the engine unit 106 and the lower unit 108 relative to the transom bracket 104 about a steering axis 172 (FIG. 2). In the present embodiment, the steering actuator 170 is a rotary hydraulic actuator, but other types of steering actuators 170 are contemplated.

As can be seen in FIG. 2, the center of gravity 160 of the engine 116 is disposed below the tilt-trim axis 166, when the assembly 100 is in a trim range. As the assembly 100 is designed to be disposed below the deck 18, the engine 116 and the transom bracket 104 partially vertically overlap, rather than the engine 116 being disposed well above the bracket 104 as would be the case in a conventional outboard engine assembly meant to extend higher relative to the watercraft body 12. In the present embodiment, the center of gravity 160 is vertically between a top end of the transom bracket 104 and a bottom end of the transom bracket 104.

Turning now to FIG. 9, the lower unit 108 includes a gearcase 174, which is fastened to the engine unit housing 110. The lower unit 108 also includes a driveshaft 176, a transmission 178, a propeller shaft 180 and the propeller 102. The driveshaft 176 is driven by the output shaft 158 via bevel gears 182. The driveshaft 176 drives the transmission 178. The transmission 178 selectively drives the propeller shaft 180 to which the propeller 102 is connected. The assembly 100 is said to be in the trim range when the propeller shaft 180 is less than fifteen degrees from horizontal. In other embodiments, this angle could be different, such as thirty degrees from horizontal for example.

The gearcase 174 defines an exhaust passage 184 for receiving exhaust gas from the engine 116. The exhaust passage 184 is fluidly connected with channels 186 near the propeller shaft 180. The channels 186 fluidly connect to passages 188 in the propeller 102 which allow exhaust gas to leave the outboard engine assembly 100 under water.

With additional reference to FIGS. 5, 6 and 10 to 12, the air intake assembly 140 will now be described in more detail. As mentioned above, the air intake assembly 140 is disposed in the engine unit housing 110. The air intake assembly 140 delivers air from outside the housing 110 to the engine 116 via an external conduit 192, delivering the air needed for combustion in the engine 116.

As best seen in FIG. 6, the air intake assembly 140 extends generally along the right side of the engine unit housing 110 and is disposed mainly between the engine 116 and the right side of the housing 110 and partially below the engine 116. In some embodiments, all or part of the air intake assembly 140 could extend along the left, front, rear, top or other sides of the housing 110, depending on the arrangement of the engine 116 and more specifically the arrangement of the engine air intakes 138. It is also contemplated that all or part of the air intake assembly 140 could extend above the engine 116, depending on the particular embodiment of the engine 116.

The air intake assembly 140 defines an air inlet 190 in the engine unit housing 110 on a top, front, right side thereof, that fluidly communicates with air exterior to the engine unit housing 110 and three outlets (not shown) fluidly connected to the three air intakes 138 of the engine 116. The air inlet 190 is fluidly connected to the external conduit 192 (FIGS. 2, 5 and 6). The external conduit 192 includes an inlet 194 (FIG. 2) located onboard the watercraft 10. The external conduit 192 is supported by the watercraft body 12. The external conduit 192 delivers air from above the water line to the air intake assembly 140, via the external conduit 192.

Figure 10:
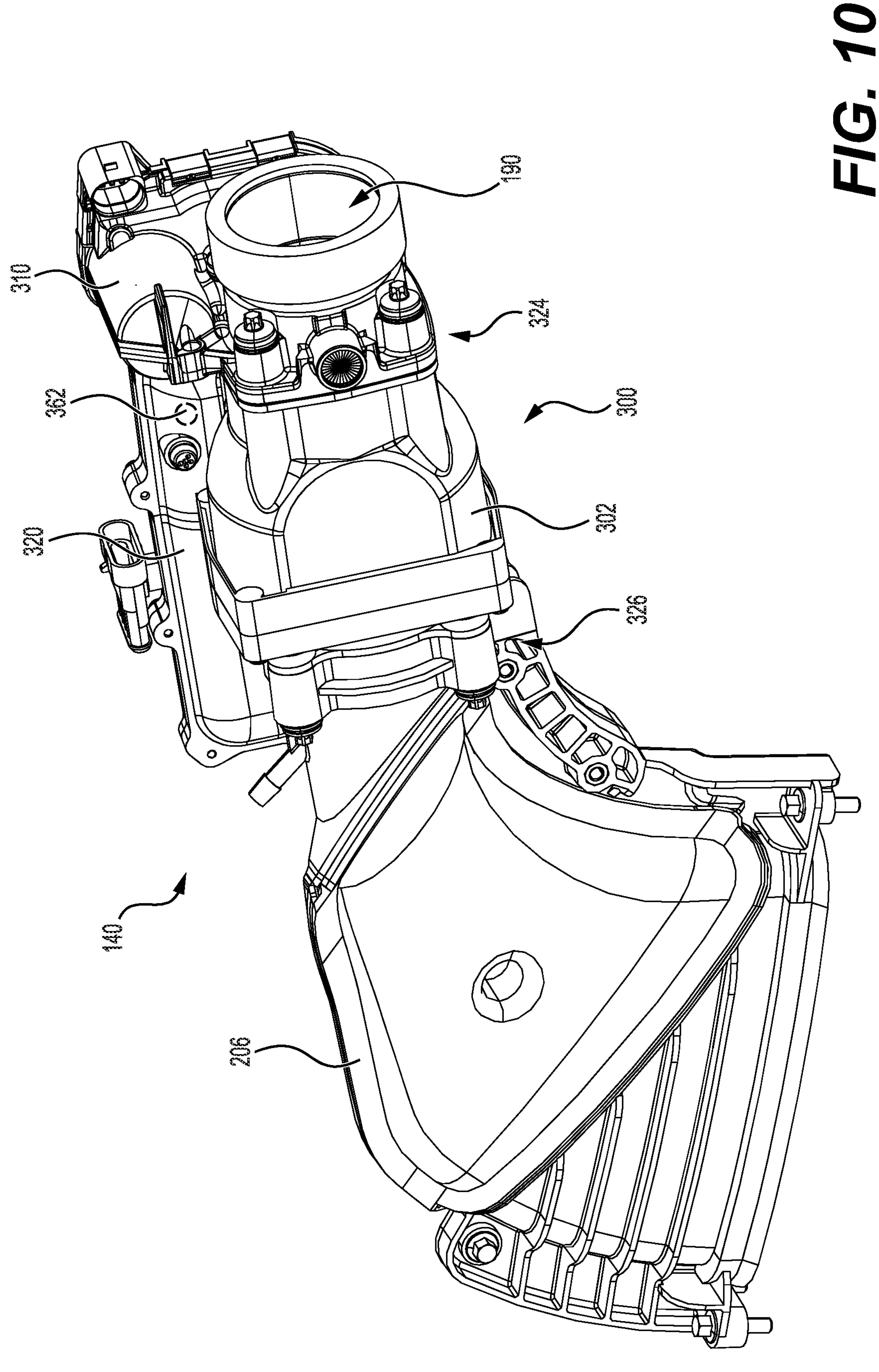
FIG. 10 is a perspective view, taken from a front, right side of an air intake valve unit and an air intake plenum of the outboard engine assembly of FIG. 2.

Additional components of the air intake assembly 140 will now be described in more detail. An air intake valve unit 300 disposed on a right side of the engine 116 has an upstream end connected to a downstream end of the external conduit 192. A plenum 206 is connected to a downstream end of the air intake valve unit 300. As can be seen in FIG. 10, the plenum 206 diverges as it extends rearward and downward from the air intake valve unit 300. As can be seen in FIG. 5, the lower end of the plenum 206 is connected to an air intake manifold 208. The air intake manifold 208 connects to the bottom of the crankcase 118 to supply air to the air intakes 138 of the engine 116. It is contemplated that some or all of the components of the air intake assembly 140 could be disposed on any other side or sides of the engine 116.

As can be seen in FIG. 5, an air pump 210 is disposed inside the engine unit housing 110. The air pump 210 is powered by a battery (not shown) provided on the boat 10. The air pump 210 is connected to a right side of the engine 116 below the air intake unit 300 and in front of the plenum 206. It is contemplated that the air pump 210 could be provided elsewhere inside the engine unit housing 110. The air pump 210 selectively supplies air from inside the engine unit housing 110 to the air intake manifold 208 as will be described in more detail below.

As can be seen in FIGS. 5 and 6, the engine unit housing 110 defines an aperture 212 on a top, front, left side thereof, that fluidly communicates with air exterior to the engine unit housing 110. The aperture 212 is fluidly connected to an external conduit 214 (FIGS. 5 and 6). The external conduit 214 includes an inlet 216. The external conduit 214 is supported by the watercraft body 12. The external conduit 214 is used for the routing of lines (not shown) that extend from components disposed inside the engine unit housing 110, then pass through the aperture 212 and the external conduit 214 to connect to components provided on the watercraft 10. The lines include, but are not limited to, battery cables to connect components inside the engine unit housing 110 to one or more batteries provided on the watercraft 10, communication lines for exchanging signals between components inside the engine unit housing 110 and components provided on the watercraft 10 such as display gauges, a throttle input, and a transmission input, and a fuel line for supplying fuel from a fuel tank on the watercraft 10 to the fuel injectors 134. It is also contemplated that the lines can include an oil supply hose for connecting an oil pump inside the engine unit housing 110 with an external oil tank located onboard the watercraft 10. The external conduit 214 also allows the exchange of air between an exterior of the engine unit housing 110 above the water line and the inside of the engine unit housing 110, thereby permitting the air pump 210 to supply this air to the air intake assembly 140.

Turning now to FIGS. 7 to 9 and 18, the exhaust system 156 will be described in more detail. As previously mentioned and as shown in FIG. 7, each combustion chamber 132 has a corresponding exhaust port 150. Exhaust gases flow from the combustion chambers 132, through the exhaust ports 150, into the exhaust manifold 152 as indicated by arrow 154. From the exhaust manifold 152, the exhaust gases flow forward into an outlet 153 (FIG. 18) and then into an exhaust passage 220 defined in the inner housing 114. The exhaust passage 220 is located in front of the engine 116. As can be seen in FIGS. 8 and 18, the exhaust passage 220 extends upward, then curves and extends downward, thus forming a gooseneck having an apex 222. The exhaust passage 220 is thus referred to as a high rise exhaust passage 220. Exhaust gas flows in the exhaust passage 220 in the direction indicated by arrow 224. The inner portion 226 of the apex 222 is vertically higher than the top of the combustion chambers 132 when the outboard engine assembly 100 is in the trim range to help prevent intrusion of water into the combustion chambers 132 from the exhaust system 156. From the exhaust passage 220, the exhaust gas flows downward and under the output shaft 158 via an exhaust outlet 228 (FIGS. 4 and 5) of the exhaust passage 220, as indicated by arrow 230. The exhaust outlet 228 is defined in the bottom face of the inner housing 114. From the exhaust outlet 228, the exhaust gases enter the gearcase 174. With reference to FIG. 9, as indicated by arrow 232, the exhaust gases flow through the exhaust passage 184, then through the channels 186, and finally through the passages 188 in the propeller 102. The ends of the passages 188 define the exhaust gas outlets 234 of the exhaust system 156.

During operation of the outboard engine assembly 100, such as when the engine is idling or operating at trolling speeds, the exhaust gas pressure may become too low to keep the water out of the lower portion of the exhaust system 156. Under these conditions, this can result in water entering the passages 188, the channels 186, the exhaust passage 184, and rising into the exhaust outlet 228 up to the same level as the water outside of the outboard engine assembly 100 (i.e. up to the waterline). As this water blocks the exhaust outlets 234, the exhaust system 156 includes an idle relief passage 236 to allow the exhaust gases to flow out of the outboard engine assembly 100 to the atmosphere. With reference to FIG. 8, the idle relief passage 236 has an idle relief passage inlet 238 communicating with the exhaust passage 228. As indicated by the dotted-line arrow 240, from the idle relief passage inlet 238 the exhaust gases flow left through a passage 242, then through a tortuous passage 244. With reference to FIGS. 5 and 6, from a top of the tortuous passage 244, the exhaust gases flow rearward through an idle relief muffler 246 disposed on top of the engine 116 as indicated by dotted-line arrow 248. From the idle relief muffler 246, the exhaust gases flow through a pipe 250 that extends through a rear of the cowling 112. The outlet of the pipe 250 is an idle relief passage outlet 252 of the idle relief passage 236. The idle relief passage outlet 252 is near a top of the engine unit housing 110 so as to be above the waterline during typical operation of the outboard engine assembly 100. It is contemplated that the idle relief passage outlet 252 could be disposed on the front, top or sides of the engine unit housing 100. It is contemplated that the idle relief passage outlet 252 could be located at other positions that are vertically higher than the exhaust outlets 234 at least when the outboard engine assembly 100 is in the trim range. It is contemplated that the idle relief muffler 246 could be omitted.

The air intake assembly 140, the crankcase 128, the transfer ports 146, the combustion chambers 132, and the exhaust system 156 together define a gas flow pathway. The gas flow pathway is the path through which gas (air or exhaust gas depending on the location) flows from the point it enters the engine unit housing 110 to be supplied to the engine 116 to the point at which it is exhausted from the outboard engine assembly 100. The air inlet 190 defines the upstream end of the gas flow pathway. The exhaust outlets 234 define the downstream end of the gas flow pathway. In embodiments where the engine 116 is a four-stroke engine, as the engine 116 has no transfer ports, and since the air does not flow through the crankcase before reaching the combustion chambers, the gas flow pathway would not include the crankcase and transfer ports.

As described above, the outboard engine 100 is provided with various features to help prevent entry of water into the combustion chambers 132 of the engine 116. Although these are effective for most conditions, there could be some rare conditions, especially when the engine 116 is stopped, where additional protection against water intrusion may be useful. Examples of such possible conditions could include a lot of weight being on the boat 10 above the outboard engine assembly 100 causing it to sink into water much lower than it typically does, the boat 10 and outboard engine assembly 100 being launched in the water at a steep angle and/or at higher than normal speed, and rough water conditions.

Figure 11:
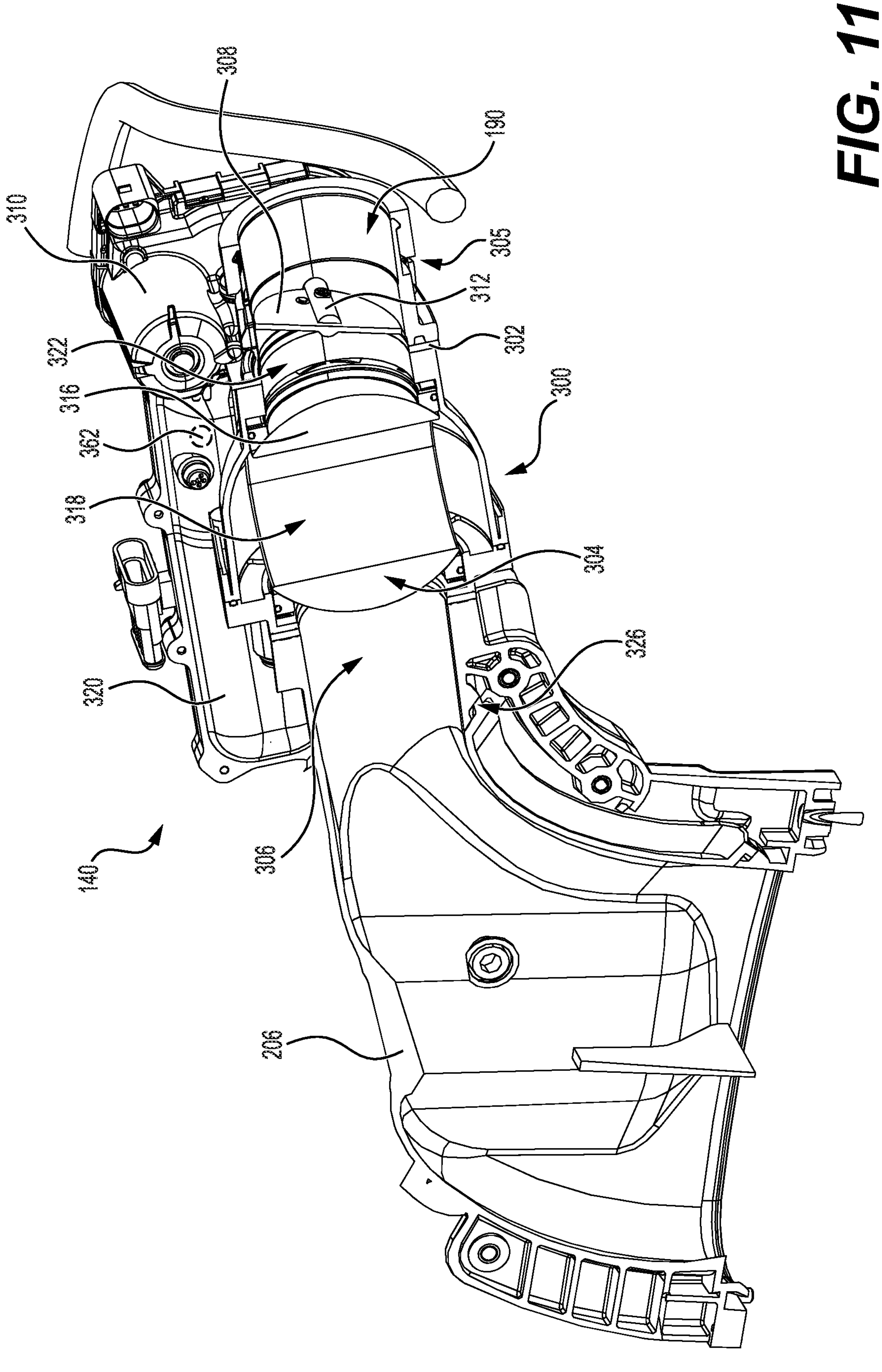
FIG. 11 is a perspective view, taken from a front, right side of a vertical and longitudinal cross-section of the air intake valve unit and the air intake plenum of FIG. 10, with a throttle valve and a sealing valve both being closed.
Figure 12:
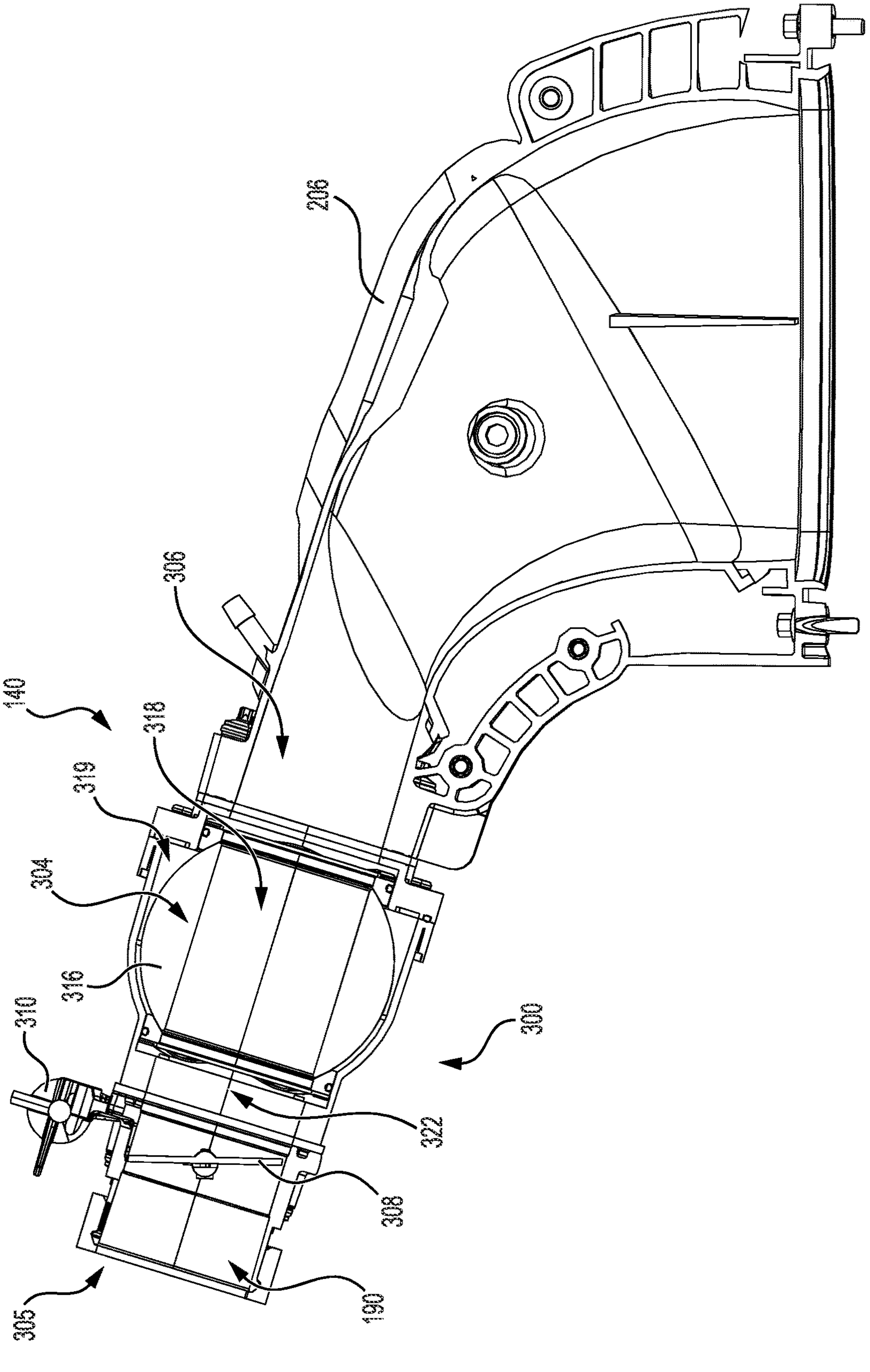
FIG. 12 is a vertical and longitudinal cross-section taken along a lateral center of the air intake valve unit and the air intake plenum of FIG. 11, with the throttle valve being closed and the sealing valve of the air intake valve unit being open.

Referring to FIGS. 10 to 12, to provide additional protection against water intrusion into the combustion chamber 136 from the exhaust system 156, the outboard engine assembly 100 is provided with a valve 304 disposed in the air intake valve unit 300, which acts as a sealing valve 304. When the sealing valve 304 is open, gas can flow through the gas flow pathway. However, when the sealing valve 304 is closed, flow of gas through the sealing valve 304 is prevented, and the sealing valve 304 thus hermetically seals the portion of the gas flow pathway downstream of the sealing valve 304 from the portion of the gas flow pathway upstream of the sealing valve 304. As a result, when the sealing valve 304 is closed, should water rise into the exhaust system 156 rise above the idle relief passage inlet 238, the gas present between the sealing valve 304 and the water having entered the exhaust system 156 is trapped and has nowhere to go. As such, this volume of air acts like an air spring pushing against the water, thus resisting increases in water level in the exhaust system 156. In embodiments where no idle relief passage 236 is provided the entire volume of gas between the sealing valve 304 and the exhaust outlets 234 could act like an air spring resisting increases in water level in the exhaust system 156.

The intake valve unit 300 has a valve unit body 302. The valve unit body 302 has an upstream end 305 and a downstream end 306. A throttle valve 308 is pivotally disposed in the valve unit body 302. A throttle valve actuator 310 disposed outside of the valve unit body 302. In the present embodiment, the throttle valve actuator 310 is an electric motor, but other types of actuators are contemplated. The throttle valve actuator 310 is connected to a shaft 312 pivotally supporting the throttle valve 308 in the valve unit body 302 for moving the throttle valve 308 between opened and closed positions.

The sealing valve 304 is disposed in the valve unit body 302 between the throttle valve 308 and the downstream end 306. In the present embodiment, the sealing valve 304 is a ball valve 304. The ball valve 304 has a ball valve body 316 defining a passage 318 therethrough. The ball valve body 316 is pivotally received in a seat 319 defined by the valve unit body 302. The ball valve body 316 is operatively connected to a sealing valve actuator 320 disposed outside of the valve unit body 302. In the present embodiment, the sealing valve actuator 320 is an electric motor, but other types of actuators are contemplated. The sealing valve actuator 320 pivots the ball valve body 316 between open and closed positions corresponding to open and closed positions of the ball valve 304.

In the open position of the ball valve 304, shown in FIG. 12, the passage 318 of the ball valve body 316 is aligned with the passage 322 defined by the valve unit body 302, and air can flow through the ball valve 304. In the closed position of the ball valve 304, shown in FIG. 11, the ball valve body 316 is pivoted such that outer surfaces 324 of the ball valve body 316 block the passage 322, thereby preventing flow of air through the ball valve 304 for hermetically sealing the portion of the valve unit body 302 downstream of the ball valve 304 from the portion of the valve unit body 302 upstream of the ball valve 304. It is contemplated that a sealing valve of a type other a ball valve could be used. For example, it is contemplated that a guillotine valve or a butterfly valve could be used as the sealing valve 304. As the intake valve unit 300 has different actuators 310 and 320 used for moving the throttle valve 308 and the sealing valve 304, the sealing valve 304 can be moved independently of the throttle valve 308 and vice versa.

Figure 13:
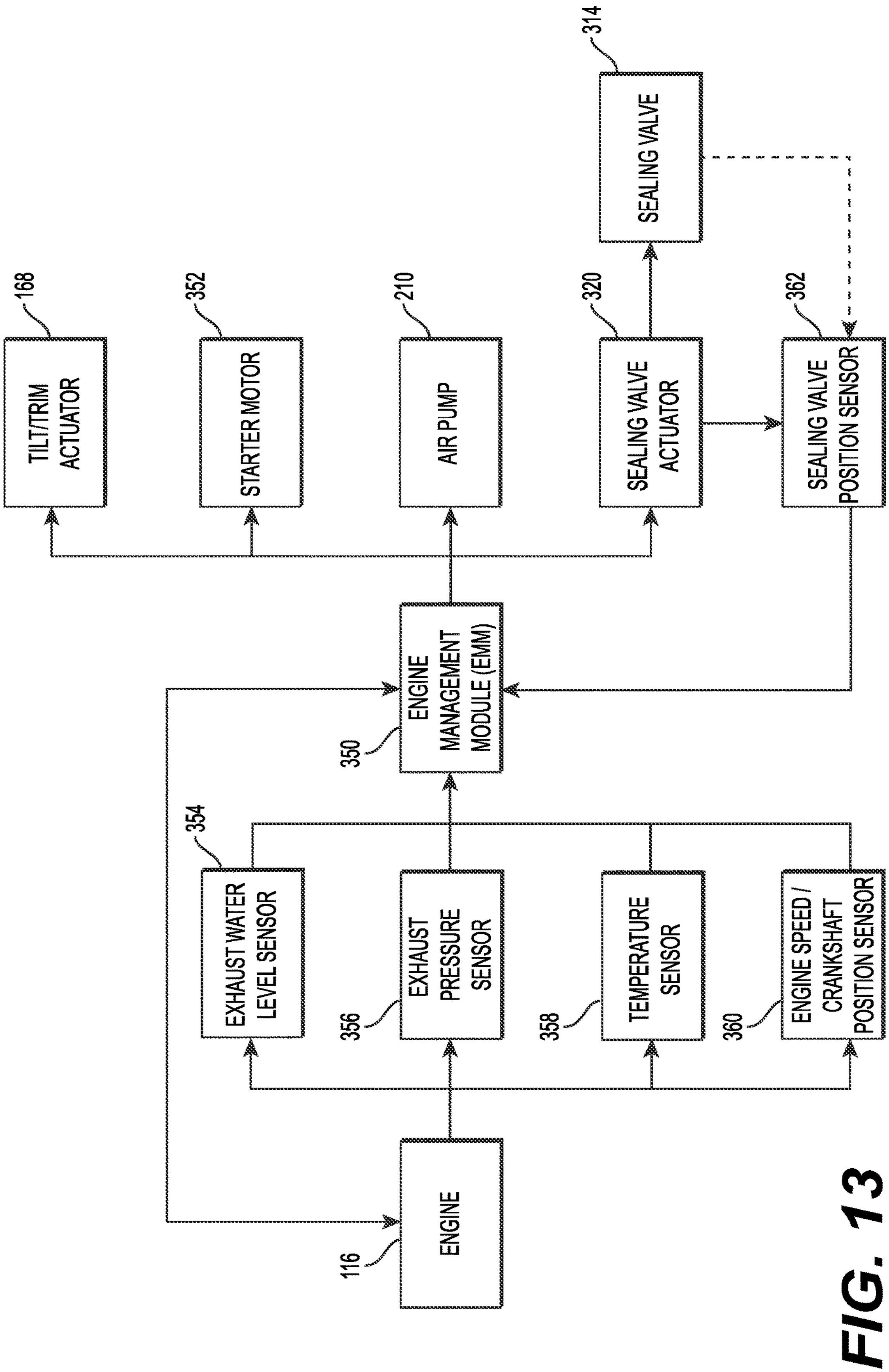
FIG. 13 is a schematic representation of some components of the outboard engine assembly of FIG. 2 involved in an operation of the sealing valve of the air intake valve unit of FIG. 10 and in an operation of an air pump of the outboard engine assembly of FIG. 2.

Turning now to FIG. 13, components of the outboard engine assembly 100 involved in an operation of the sealing valve 304 of the air intake valve unit 300 and in an operation of the air pump 210 will be described.

Figure 16:
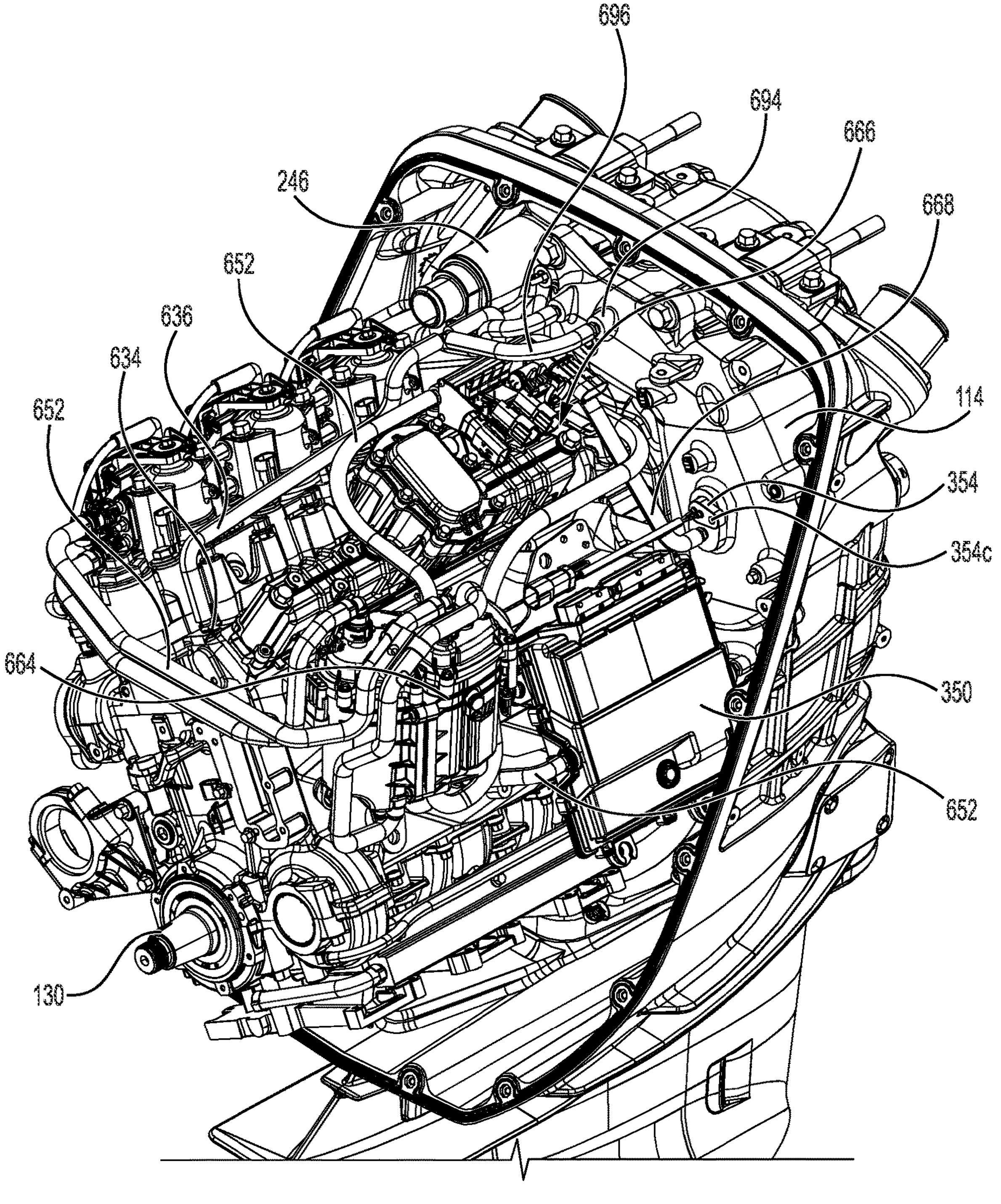
FIG. 16 is a perspective view taken from a top, rear, right side of the outboard engine assembly of FIG. 2, with a cowling of the engine unit housing and the air intake valve unit and the air intake plenum removed.
Figure 17:
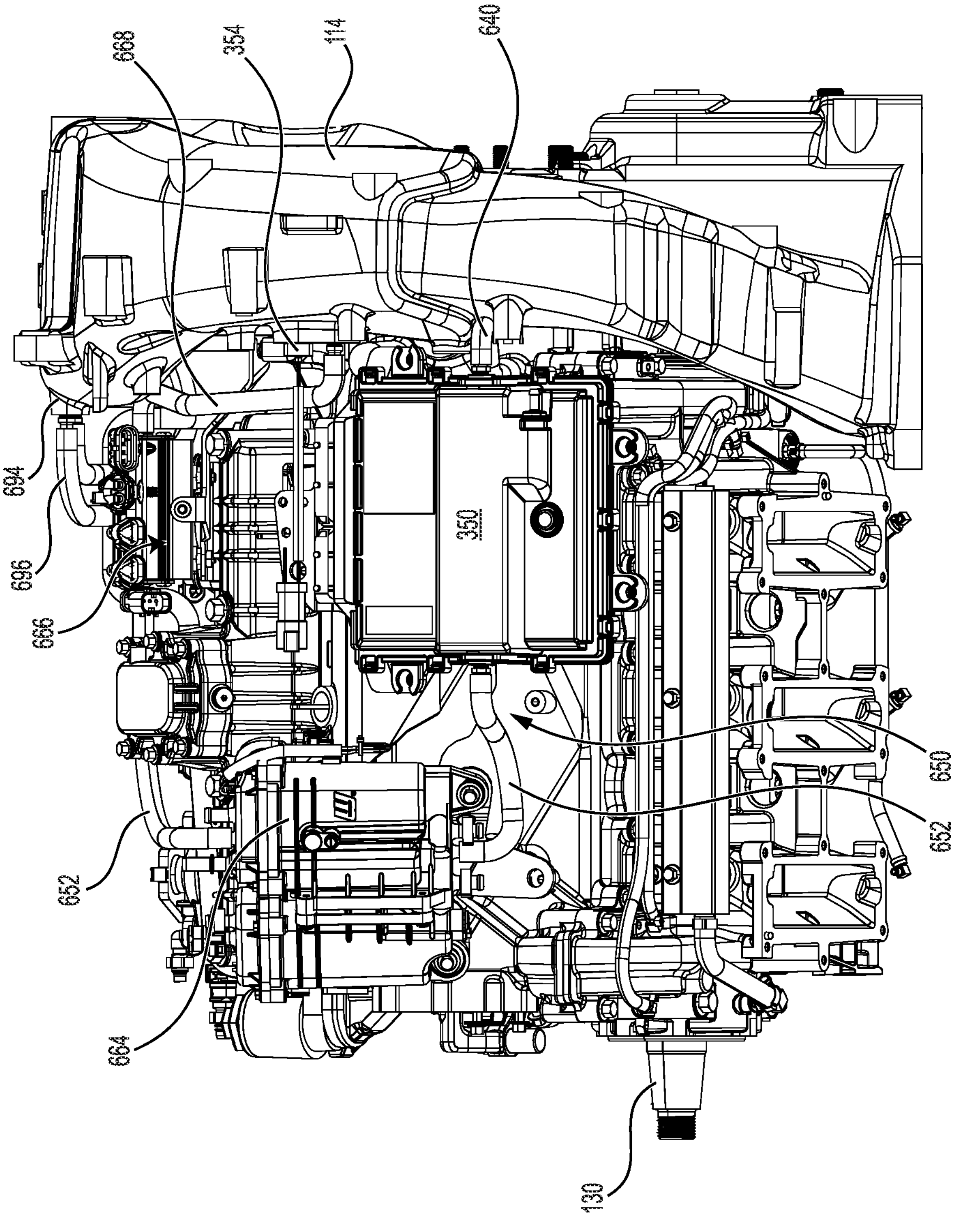
FIG. 17 is a right side elevation view of an engine and inner housing of the outboard engine assembly of FIG. 2.

A control module 350, also known as an engine management module (EMM), is provided inside the engine unit housing 110 (FIGS. 16 and 17). The EMM 350 includes multiple processors and data storage modules. The EMM 350 is connected to and controls the operation of the engine 116, including the starter motor 352, the tilt/trim actuator 168, the air pump 210 and the sealing valve actuator 320. In order to control these components, the EMM 350 is connected to and receives signals from a water sensor 354 for detecting presence of water in the exhaust system 156, an exhaust pressure sensor 356, a temperature sensor 358, an engine speed/crankshaft position sensor 360, a sealing valve position sensor 362 as well as other sensors provided on the engine 116, in the outboard engine assembly 100, such as a throttle valve position sensor (not shown), and on the boat 10, such as a shift lever position sensor (not shown).

Figure 21:
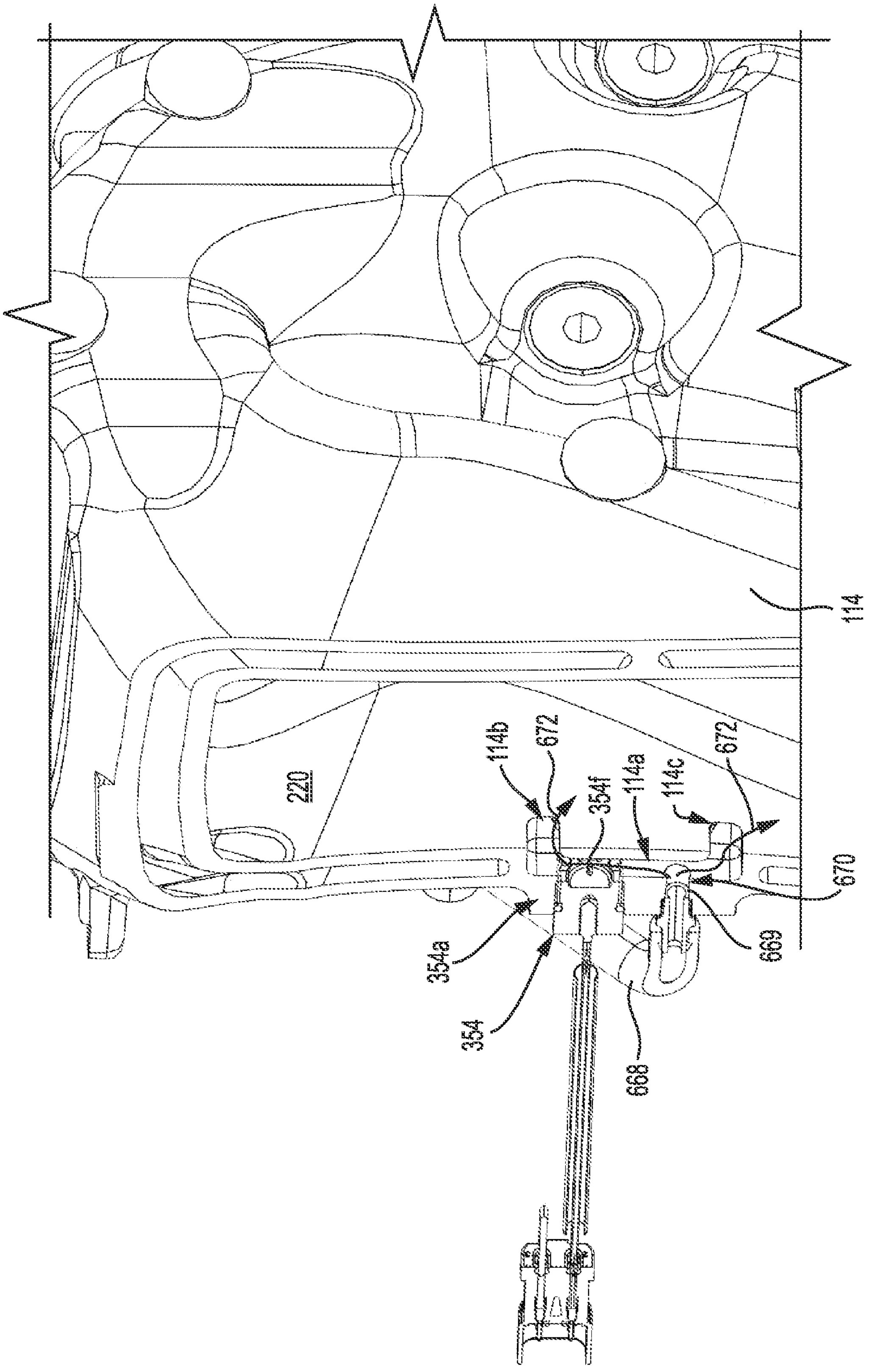
FIG. 21 is a perspective, cross-sectional view of the inner housing, a water sensor and a cooling water conduit of the outboard engine assembly of FIG. 2, taken through line 21-21 of FIG. 18.
Figure 22:
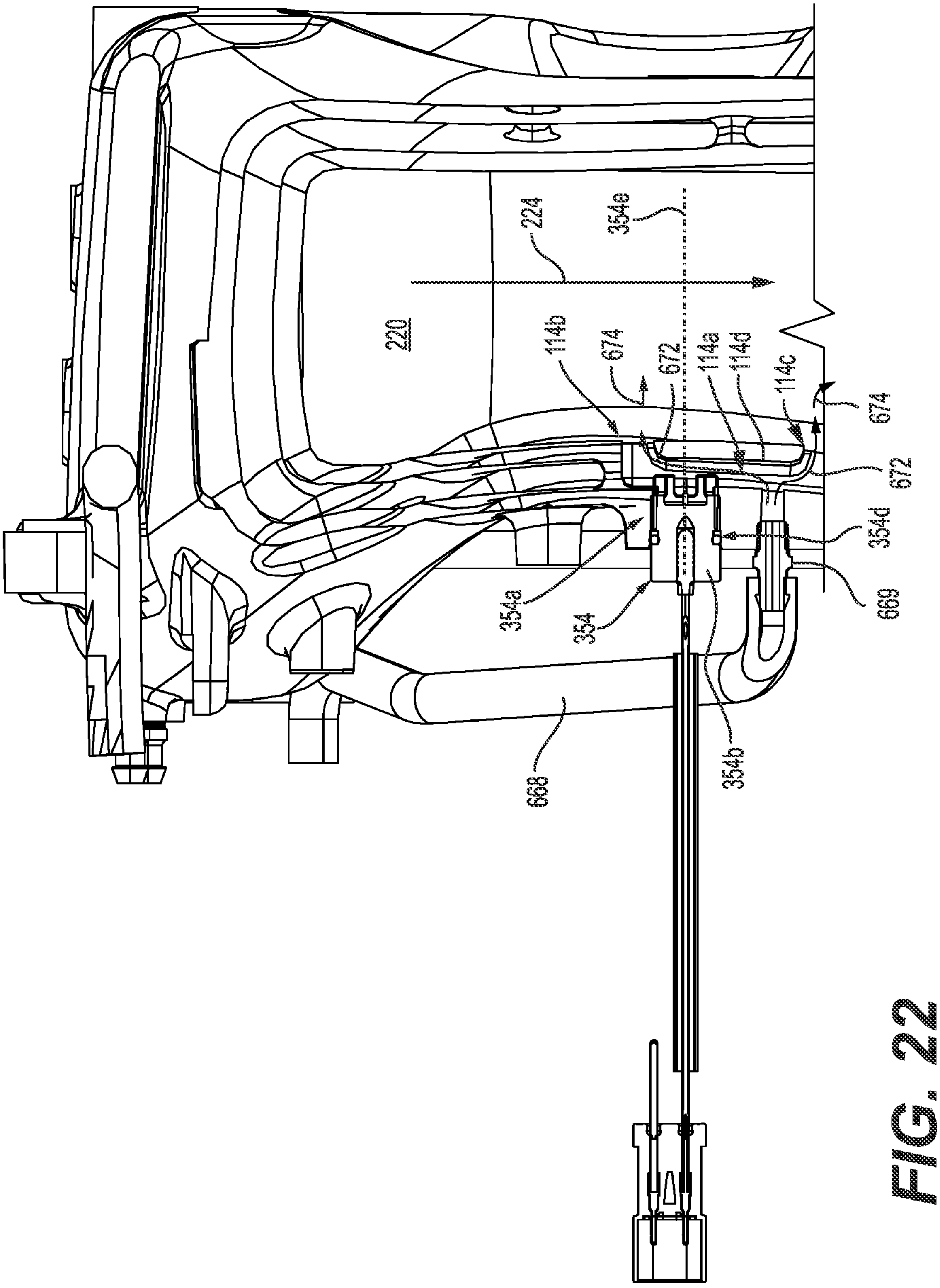
FIG. 22 is a right side elevation view of the cross-section of FIG. 21.
Figure 23:
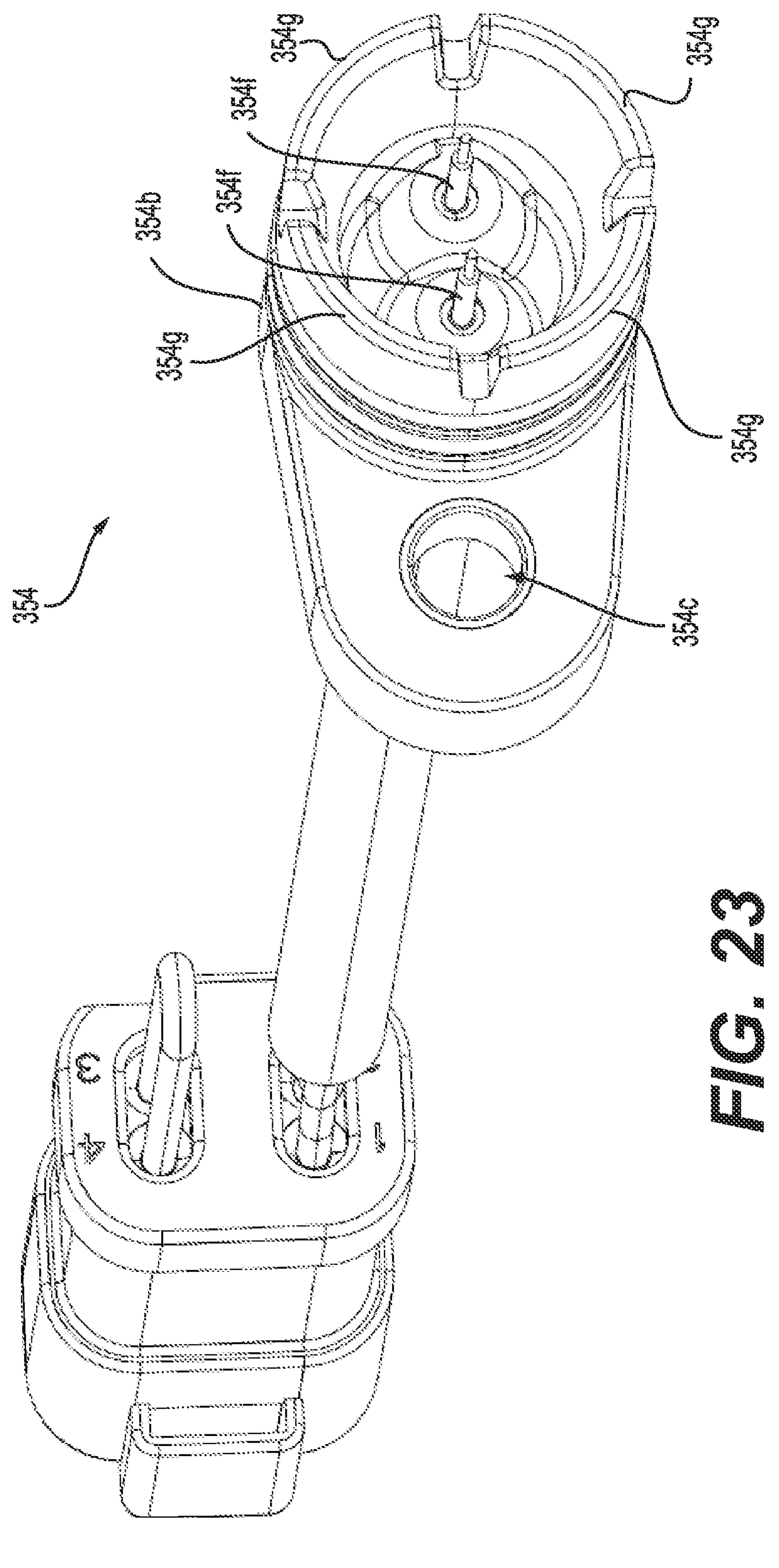
FIG. 23 is a perspective view taken from a front, right side of the water sensor of FIG. 21.

As can be seen in FIGS. 8, 18, 21 and 22, the water sensor 354 is located in the exhaust passage 220. The water sensor 354 (schematically represented by a dot in FIGS. 8 and 18) is disposed at a position downstream of the apex 222 and upstream of the idle relief passage inlet 238, upstream of the exhaust outlet 228 of the exhaust passage 220, and upstream of the exhaust outlet 234 of the exhaust system 156. The water sensor 354 is also disposed above the crankshaft axis 130*a* (FIG. 18). More particularly, the inner housing 114 forms a sensor passage 354*a* in a rear face thereof. A sensor housing 354*b* of the water sensor 354 has a tab defining an aperture 354*c* adapted for receiving a fastener for connecting the water sensor 354 to the inner housing 114. The sensor housing 354*b* also defines a recess 354*d* adapted for receiving an O-ring for sealing the water sensor 354 to the inner housing 114. The water sensor 354 is thus replaceable, if needed. As best seen in FIG. 22, the water sensor 354 defines a water sensor axis 354*e* corresponding to a longitudinal centerline of the sensor housing 354*b*. When the water sensor 354 is connected to the inner housing 114, the water sensor axis 354*e* is substantially parallel to the crankshaft axis 130*a*. It is contemplated that the water sensor 354 could be positioned otherwise in other implementations, and could have, for example, the water sensor axis 354*e* substantially perpendicular to the crankshaft axis 130*a*.

Referring to FIGS. 18, 21 and 22, the inner housing 114 further forms a pocket 114*a* in the exhaust passage 220. The pocket 114*a* communicates with the sensor passage 354*a*. The pocket 114*a* defines an outlet 114*b* extending above the water sensor 354, and an outlet 114*c* extending below the water sensor 354.

Two probes 354*f* of the water sensor 354 extend at least partially in the sensor passage 354*a*. When water is present, an electrical current passes between the probes 354*f*, which indicates the presence of water. In some implementation, the water sensor 354 is a sensor of the type used for detecting water in a fuel tank, also known as Water-in-Fuel (WiF) sensor. It is contemplated that other types of water sensors could be used in other implementations. The sensor housing 354*b* of the water sensor 354 further includes four shrouds 354*g* disposed around the probes 354*f* for protecting the probes 354*f*.

When water makes contact with the water sensor 354, the probes 354*f* detect the presence of water, and the water sensor 354 sends a signal to the EMM 350 indicating that water has reached the level of the water sensor 354 in the exhaust system 156 and that some actions should be taken as will be described below. For example, when the engine 116 is stopped, should water rise in the exhaust passage 220, water will enter the pocket 114*a* through the outlet 114*c*. Then as water keeps rising, water will go up in the pocket 114*a* and when water reaches the probes 354*f*, the water sensor 354 detects the presence of water, and the methods described below will be initiated. As can also be seen in FIG. 8, the exhaust pressure sensor 356 is also located in the exhaust passage 220, at a position downstream of the apex 222 and upstream of the idle relief passage inlet 238. It is contemplated that the exhaust pressure sensor 356 could be at other locations in the exhaust system 156 upstream of the idle relief passage inlet 238, or that the exhaust pressure sensor 356 could be omitted. The exhaust pressure sensor 356 sends a signal indicative of gas pressure in the exhaust system 156. The temperature sensor 358 could be an exhaust temperature sensor sensing temperature in the exhaust system 156, an intake air temperature sensor sensing temperature in the air intake assembly 140, or a temperature sensor sensing temperature in the engine unit housing 110 around the engine 116. It is contemplated that one or more of these temperature sensors could be provided to send signals indicative of temperature to the EMM 350. For simplicity, the present will refer only to one temperature sensor 358, that could be any one or combinations of the aforementioned temperature sensors.

The engine speed/crankshaft position sensor 360 is located close to the crankshaft 130 or to an element that turns at the same speed as the crankshaft (such as a flywheel for example) to send signals to the EMM 350 that let the EMM 350 determine the orientation of the crankshaft 130, which allows the EMM 350 to know where each of the pistons 126 are positioned, and the speed of rotation of the crankshaft 130. When the engine 116 is first engaged by the starter motor 352 in order to start then engine 116, the EMM 350 is able to determine the position of the crankshaft 130 within the first or the first few rotations of the crankshaft 130 using the signals from the engine speed/crankshaft position sensor 360. This process of initially determining the position of the crankshaft 130 by the EMM 350 is sometimes referred to as synchronizing of the EMM 350 or "synch". If the EMM 350 is unable to synch, the starter motor 352 will be de-energized and the engine 116 will not be started.

The sealing valve position sensor 362, as its name suggest, sends a signal to the EMM 350 indicative of the position of the sealing valve 304. It is contemplated that the sealing valve position sensor 362 could be integrated with the sealing valve actuator 320 or could be a dedicated sensor sensing the position of sealing valve 304. It is also contemplated that the sealing valve position sensor 362 could only provide an indication of whether the sealing valve 304 is open or closed, without an exact indication of its position.

Figure 14:
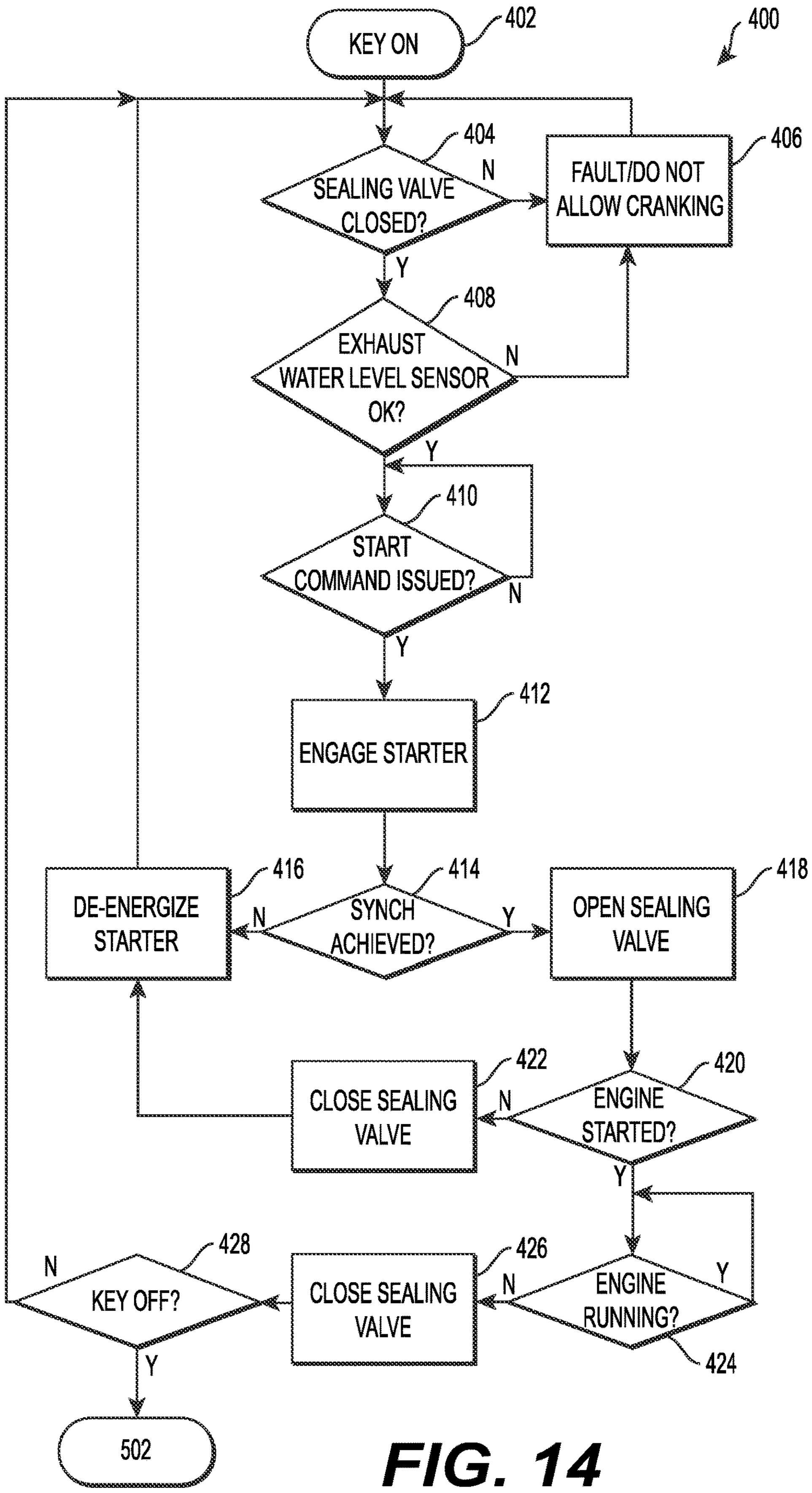
FIG. 14 is a flowchart illustrating the operation of the sealing valve of the air intake valve unit of FIG. 10.

Turning now to FIG. 14, a method 400 of operating the sealing valve 304 will be described. The method 400 begins at step 402 when the EMM 350 is awakened or turned on. In a boat 10 requiring a key to permit starting of the engine 116, this corresponds to when the key is inserted and at least partially turned, hence the name "key on" of step 402 in FIG. 21. It is contemplated that in boats 10 that does not require a key, this could correspond to the actuation of a button, a switch, a combination of buttons, or the detection of proximity of a remote fob or of the press of a button on the remote fob.

When the engine 116 stops running, the EMM 350 sends a signal to the sealing valve actuator 320 to close the sealing valve 304, as will be explained below with respect to step 426. Accordingly, from step 402, at step 404 the EMM 350 determines if the sealing valve 304 is closed (as it should be). If not, at step 406 the EMM 350 records a fault, does not allow cranking (i.e. starting) of the engine 116, and sends signals to provide an indication of this to the driver of the boat 10. The indication could be visual, such as a light turning on on a console, or auditory, such as one or more beeps.

If at step 404, the sealing valve 304 is closed, then at step 408 the EMM 350 determines if the water sensor 354 is okay, meaning that it does not detect the presence of water. If water is detected, then the EMM 350 goes to step 406 described above. If the water sensor 354 does not detect the presence of water, then at step 410 the EMM 350 checks if a start command has been issued. This could be the above-mentioned key being turned to a start position, or a start button being pressed for example. The EMM 350 will hold at step 410 until a start command is issued.

Once a start command is issued, then at step 412 the EMM 350 sends a signal to the starter motor 352 to engage the engine 116 and start turning the crankshaft 130. Then at step 414, the EMM 350 determines if the above-mentioned synchronization (synch) of the EMM 350 has been achieved. If not, then the EMM 350 sends a signal to the starter 352 to de-energize at step 416 and then returns to step 404. If synchronization is achieved, at step 418 the EMM 350 sends a signal to the sealing valve actuator 320 to open the sealing valve 304. It is contemplated that in an alternative embodiment, the EMM 350 could send a signal to the sealing valve actuator 320 to at least partially open the sealing valve 304 slightly prior to or at the same time as performing step 412, then if synchronization is not achieved at step 414, the EMM 350 would send a signal to the sealing valve actuator 320 to close the sealing valve 304 before returning to step 404.

Once the sealing valve 304 is open, then at step 420 the EMM 350 determines if the engine 116 is running. This can be done by determining if the engine speed is higher than a predetermined speed for example, which would indicate that the engine 116 can turn the crankshaft 130 without the assistance of the starter 352. If the engine 116 is not running after a predetermined period of time, the EMM 350 sends a signal to the sealing valve actuator 320 to close the sealing valve 304 at step 422, then goes to step 416 where the starter 352 is de-energized as indicated above, and the returns to step 404.

If at step 420 it is determined that the engine 116 is started, the EMM 350 sends a signal to de-energize the starter motor 350 (not shown), and then the EMM 350 monitors if the engine 116 is running at step 424. The EMM 350 will hold at step 424 as long as the engine 116 is running. Once the engine 116 stops running, then at step 426 the EMM 350 sends a signal to the sealing valve actuator 320 to close the sealing valve 304, thus helping to prevent the intrusion of water into the combustion chambers 132 via the exhaust system 156 while the engine 116 is stopped, as described above. Then at step 428, the EMM 350 determines if the key has been removed (hence the name "key off") or an equivalent action that results in the EMM 350 being put to sleep, such as pressing an off button for example. If not, then the EMM 350 returns to step 404. If so, then the EMM 350 moves to step 502 of method 500 described below.

It is contemplated that a time delay could be applied before closing the sealing valve 304 at step 426. The reason for doing so would be to take into account thermal contraction of the gas into the gas flow pathway. When the engine 116 stops, the air in the gas flow pathway is hot. As it cools, the air contract which could reduce the volume of air trapped by the sealing valve 304 if the sealing valve 304 is closed right away. As such waiting for the gas in the gas flow path to cool before closing the sealing valve 304 could help prevent the reduction of gas volume due to thermal contraction. The time could be a set amount of time or an amount of time based on the temperature sensed by the temperature sensor 358. It is also contemplated that when the engine 116 stops running and the sealing valve 304 is closed, the EMM 350 could send a signal to the tilt/trim actuator 168 to trim the outboard engine assembly 100 up, thus lifting the outboard engine assembly 100 partially out of water.

If at any time during the method 400 the engine 116 stops running and/or a "key off" event (see step 428 above) occurs, the EMM 350 sends a signal to the sealing valve actuator 320 to close the sealing valve 304.

Figure 15:
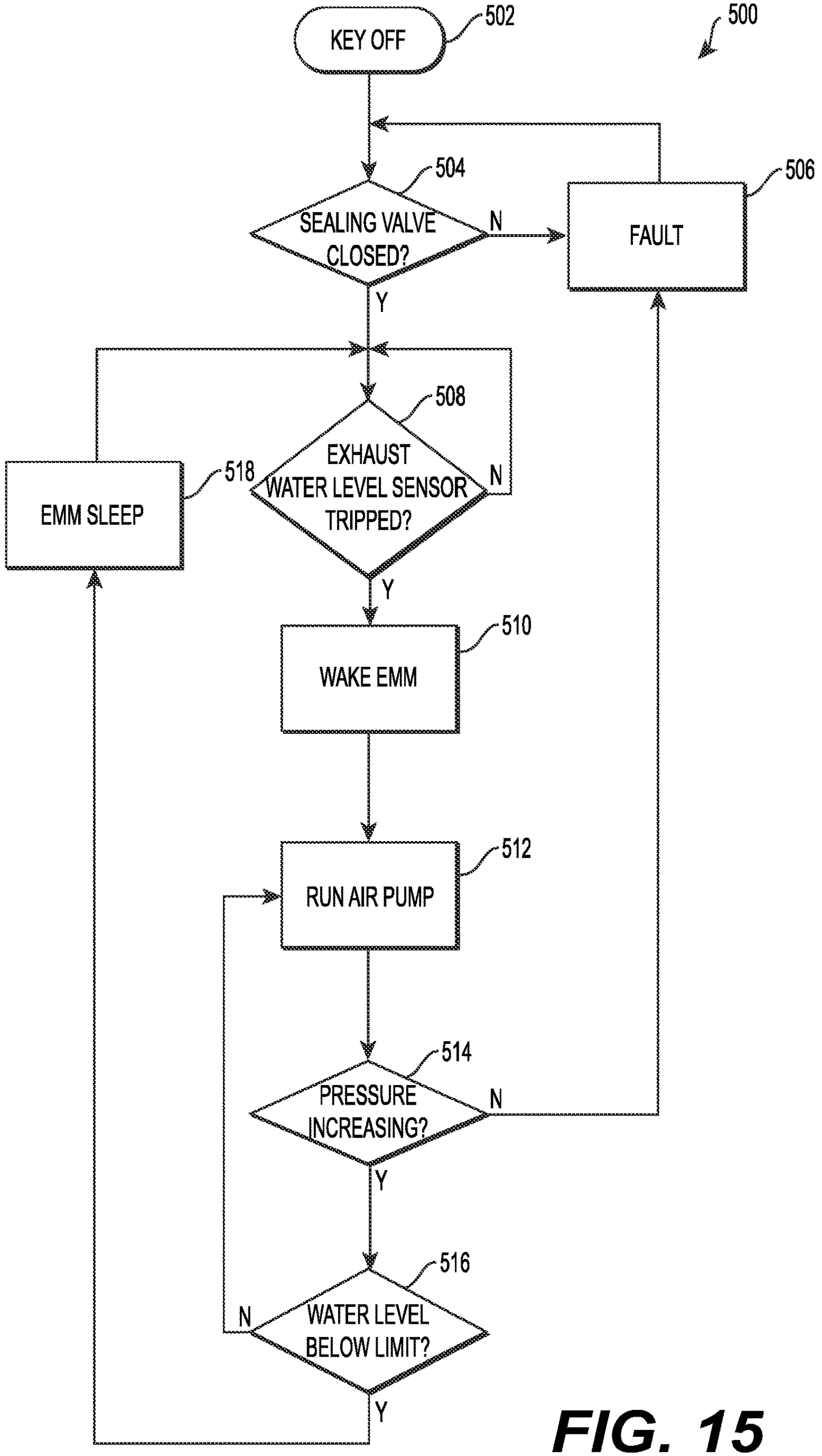
FIG. 15 is a flowchart illustrating the operation of the air pump of FIG. 13.

Turning now to FIG. 15, a method 500 for preventing intrusion of water into the combustion chambers 132 of the engine 116 from the exhaust system 156 will be described. The method begins at step 502 following a "key off" condition (step 428) occurring. The EMM 350 waits until the engine 116 is completely stopped (i.e. engine speed/crankshaft position sensor 360 determines that engine speed is 0 RPM) before performing step 504. Then at step 504, the EMM 350 determines if the sealing valve 304 is closed as it is supposed to be. If not, then at step 506 the EMM 350 records a fault and returns to step 504. It is contemplated that the EMM 350 could then send another signal to reattempt to close the sealing valve 304. If at step 504 the sealing valve 304 is closed, the EMM 350 goes to sleep. In other embodiments, it is contemplated that after determining that the sealing valve 304 is closed, the EMM 350 runs the air pump 210 for a predetermined amount of time, and after the predetermined amount of time has lapsed, the EMM 350 checks if the water sensor 354 detects the presence of water. If no water is detected by the water sensor 354, the EMM 350 goes to sleep. If water is detected by the water sensor 354, the air pump 210 is run for another predetermined amount of time, and the EMM 350 further checks if the water sensor 354 detects the presence of water until no water is detected by the water sensor 354.

Even though the EMM 350 is in a sleep mode, the exhaust water level sensor 354 is still powered in order to monitor the level of water in the exhaust system 156 at step 508. If the water sensor 354 is tripped (i.e. water reaches the level of the water sensor 354), the water sensor 354 sends a signal to wake the EMM 350 at step 510. Then at step 512, the EMM 350 sends a signal to run the air pump 210. When it runs, the pump 210 supplies air downstream of the closed sealing valve 304 in an attempt to push the water out of the exhaust system 156. More specifically, the air pump 210 supplies air upstream of the engine 116, in the air intake manifold 208 of the air intake assembly 140.

Once the signal to run the air pump 210 is sent at step 512, the EMM 350 determines if the pressure sensed by the exhaust pressure sensor 356 increases. If the pressure is not increasing, it could be an indication that the pump 210 has failed (i.e. is not running or not running properly) or that there is a leak in the gas flow path between the sealing valve 304 and the water level in the exhaust system 156, or that the sealing valve 304 is not sealing properly. As such, if at step 514 the pressure is not increasing, then the EMM 350 stops the air pump 210 (not shown), records a fault at step 506 and returns to step 504. If at step 514 the pressure increases, then the EMM 350 continues to step 516. It is contemplated that at step 514 the EMM 350 could determine that the pressure is increasing at or above a predetermined rate.

At step 516, the EMM 350 determines based on the signal from the water sensor 354 if the water is now at a level below the water sensor 354. If not, the EMM 350 returns to step 512 and the pump 210 continues to run. If the water level is below the water sensor 354, then the EMM 350 stops operating the air pump 210 (not shown), goes back to sleep 518, and the water sensor 354 resumes monitoring of the water level.

It is contemplated that in addition to running the air pump 210 at step 512, the EMM 350 could send a signal to the tilt/trim actuator 168 to trim the outboard engine assembly 100 up, thus lifting the outboard engine assembly 100 partially out of water. It is also contemplated that, if at step 514 the pressure is not increasing, the EMM 350 could send a signal to the tilt/trim actuator 168 to trim the outboard engine assembly 100 up, thus lifting the outboard engine assembly 100 partially out of water. It is also contemplated that steps 514 and 516 could be omitted and that instead the air pump 210 could be made to run for a predetermined amount of time. It is also contemplated that the air pump 210 could be made to run for a predetermined amount of time at predetermined time intervals even if the water sensor 354 has not been tripped. Finally, it is contemplated that the above method could be adapted to use the air pump 210 to remove water from the exhaust system 156 in embodiments where the sealing valve 304 is not provided.

If at any time during the method 500 a "key on" event (see step 402 above) occurs, the EMM 350 stops method 500 and begins method 400 at step 302.

Turning now to FIGS. 2 to 6, 18 and 20, a cooling system 600 of the outboard engine assembly 100 will be described. The cooling system 600 uses water from the body of water on which the outboard engine assembly 100 is operated to cool itself. The cooling system 600 includes two water intakes 602 (FIG. 2) defined on either side of the gearcase 174. The water intakes 602 have grates 604 to filter out relatively large particles and/or debris from the water entering the cooling system 600. A gearcase cooling water passage 606 (FIG. 4) is defined in the gearcase 174 to fluidly connect the water intakes 602 to an inlet 610 of a water pump 612 housed in the lower portion of the inner housing 114. The water pump 612 is a rotary pump driven by the driveshaft 176. The water pump 612 has an outlet 614 defined above the inlet 610. The outlet 614 is fluidly connected to inner housing cooling water passages 620 (FIGS. 4 and 18) formed in the inner housing 114. The cooling water that is supplied by the water pump 612 flows in the inner housing cooling water passages 620 as indicated by arrows 621 and onto various components of the outboard engine assembly 100 in order to lower temperature and/or maintain temperature within operating range of these components.

Figure 19:
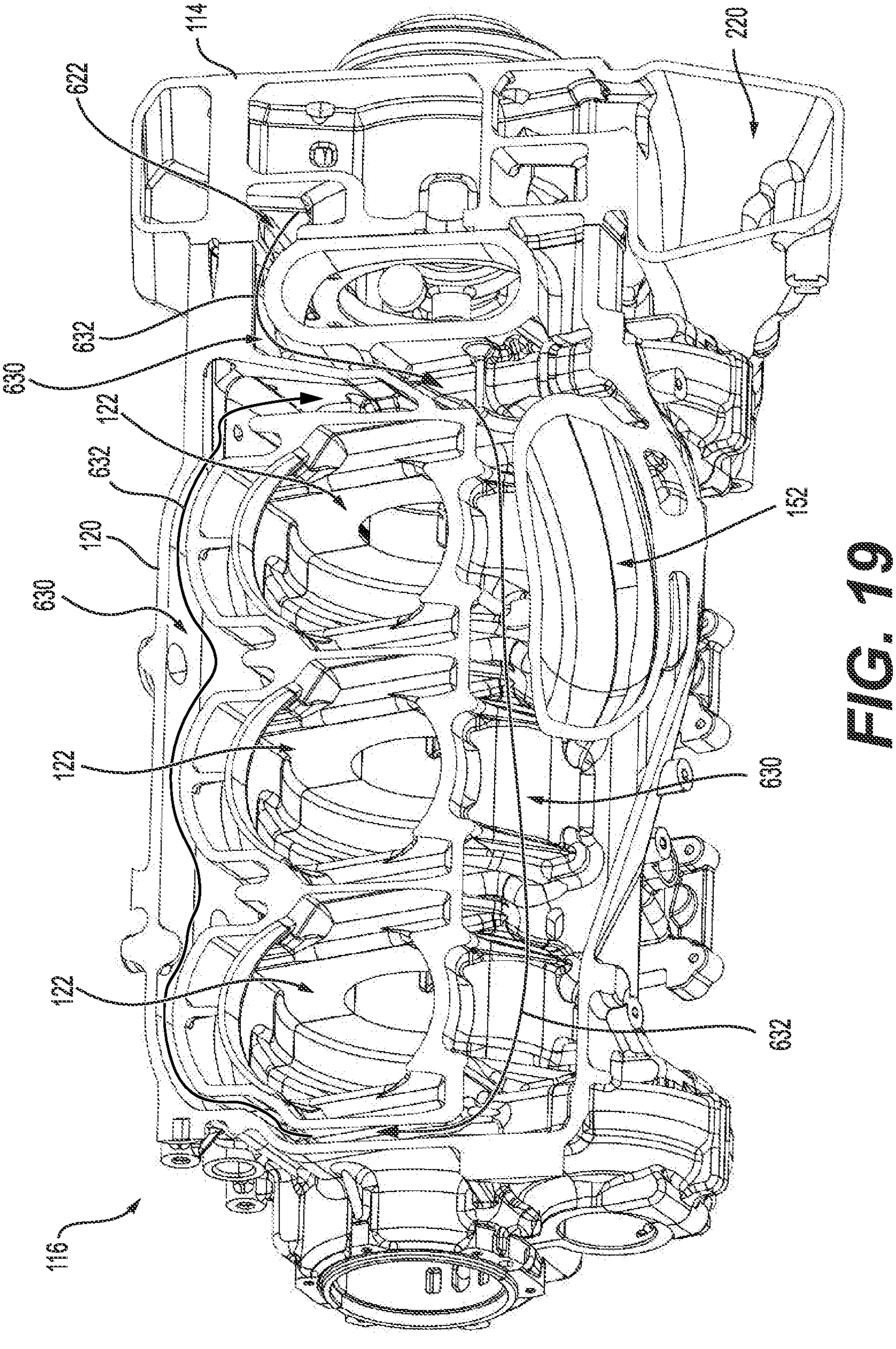
FIG. 19 is a cross-sectional view of the inner housing and the cylinder block of the outboard engine assembly of FIG. 2, taken through line 19-19 of FIG. 18.
Figure 20:
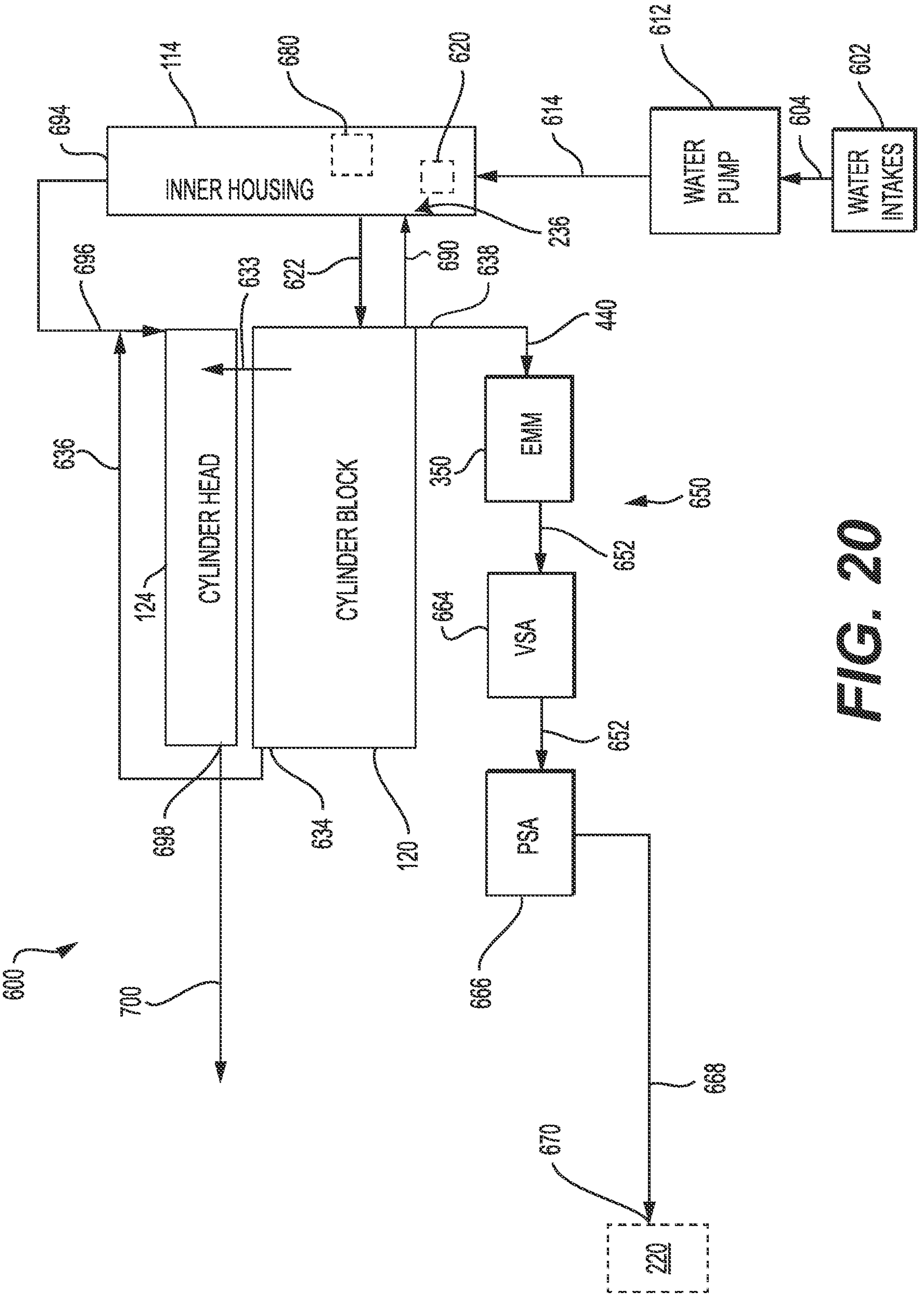
FIG. 20 is a flowchart of a cooling system of the outboard engine assembly of FIG. 2.

From the inner housing cooling water passages 620, cooling water flows through the cooling water outlet 622 (FIG. 19) defined in the inner housing 114 and into engine cooling water passages 630 defined in the cylinder block 120. As best seen in FIG. 19, the engine cooling water passages 630 are defined around the cylinders 122. Cooling water flows as indicated by arrows 632 shown in FIG. 19. Cooling water flows from the engine cooling water passages 630 to cylinder head water cooling passages (not shown) defined in the cylinder head 124 as indicated by arrow 633 in FIG. 20. Referring to FIGS. 5, 6 and 20, a cylinder block vent 634 is defined in the cylinder block 120 and allows air to escape the engine cooling water passages 630 and for the cooling water to flow out of the engine cooling water passages 630. A conduit 636 is fluidly connected to the cylinder block vent 634 and extends forwardly above the cylinder block 120. Another cylinder block vent 638 (FIGS. 6 and 20) is defined on the right side of the cylinder block 120. A conduit 640 (FIG. 17) is fluidly connected to the cylinder block vent 638 and allows flow of cooling water from the engine cooling water passages 630 therein. The conduit 640 is part of a cooling circuit 650 that provides cooling water to different components of the outboard engine assembly 100. Notably, the cooling circuit 650 includes intermediate cooling water conduits 652 providing cooling water to the EMM 350, a vapor separator assembly 664 (FIGS. 5, 16, VSA in FIG. 20) and a power steering assembly 666 (FIGS. 5, 6 and 16, PSA in FIG. 20) one after the other in series.

A cooling water conduit 668 (FIGS. 16 and 17) directs water from the power steering assembly 666 to a fitting 669 (FIGS. 21 and 22) connected to the inner housing 114 and forming a cooling water conduit outlet 670 (FIGS. 21 and 22). The cooling water conduit outlet 670 fluidly communicates with the exhaust system 156 for supplying water into the exhaust system 156 in order to cool the exhaust gases flowing therethrough. More particularly, the cooling water conduit outlet 670 supplies water into the pocket 114*a* and then to the exhaust passage 220 via the outlets 114*b*, 114*c*, as indicated by arrows 672 in FIGS. 21 and 22. The cooling water conduit outlet 670 is positioned such that water exiting the cooling water conduit 668 flows across the water sensor 354. In the present implementation, the water sensor 354 is disposed above the cooling water conduit outlet 670, but the water sensor 354 could be positioned elsewhere, such as below or beside the cooling water conduit outlet 670, in other implementations.

Referring to FIG. 22, when water exits the cooling water conduit outlet 670, the water hits wall 114*d* of the inner housing 114 and a portion of the water flows upward in the pocket 114*a*, past the sensor passage 354*a* and across the probes 354*d* of the water sensor 354 and then to the outlet 114*b* disposed above the cooling water conduit outlet 670, while another portion of the water flows downward in the pocket 114*a* and then to the outlet 114*c* disposed below the cooling water outlet 670. In other words, water flowing upward within the pocket 114*a* flows between the water sensor 354 and the exhaust passage 220.

As a portion of the water exiting the cooling water conduit outlet 670 flows across the water sensor 354 during operation of the engine 116, the flow of water across the water sensor 354 prevents, or at least reduces, the exposure of the probes 354*d* to hot exhaust gas, thereby preventing or reducing carbon buildup on the probes 354*d* and keeping the probes 354*d* cool. Furthermore, since water exits the cooling water conduit outlet 670 when the engine 116 is in operation, a diagnostic check can be performed by the EMM 350 while the engine 116 is in operation to ensure the water sensor 354 is functioning properly. For example, should no water be detected by the water sensor 354 while the engine 108 is in operation, a fault code could be registered in the EMM 350 indicating that the water sensor 354 and/or the cooling circuit 650 should be checked. Conversely, the water sensor 354 detecting water during operating of the engine 116 can be used to indicate that the cooling system 600 of the outboard engine assembly 100 is functioning. In the illustrated implementation, the fitting 669 is located below the water sensor 354 and the pocket 114*a* is provided with a lower outlet 114*c* so that any water remaining in the cooling circuit 650 after the engine 116 has ceased operation will drip downwards from the fitting 669 and out the lower outlet 114*c*, rather than flowing past the sensor probes 354*f* and potentially providing a false positive signal to the EMM 350.

Water flowing out of the outlets 114*b*, 114*c* then flows into the exhaust passage 220 as indicated by arrows 674 (FIG. 22), mixes with the exhaust gases flowing in the exhaust passage 220 and cools the exhaust gases. Mixing water with the exhaust gases reduces the temperature of the exhaust gases and may reduce the emissions of some constituents of the exhaust gases in some circumstances. The mixture of exhaust gases and water flows downward to the exhaust outlet 228 of the exhaust passage 220 and on to the exhaust passage 134 defined in the gearcase 174, and cooling water is expelled through the propeller 102 along with exhaust gases.

Referring to FIGS. 8 and 18, an exhaust water jacket 690 is defined in the inner housing 114. Cooling water flows in the exhaust water jacket 690 from the inner housing cooling water passages 620 as indicated by arrows 692 in FIG. 18. The exhaust water jacket 690 surrounds a portion of the high rise exhaust passage 220. It is contemplated that the exhaust water jacket 690 could surround a greater or smaller portion of the exhaust passage 220 in other implementations. A vent 694 (FIG. 16) is defined in the region proximate the apex 222 of the exhaust passage 220 and allows air to escape from the exhaust water jacket 690 and to cooling water to flow out of the exhaust water jacket 690. Cooling water flowing through the vent 694 is directed toward the cylinder head 122 via a conduit 696 (FIGS. 6 and 16). The cooling water flowing in the conduit 636 and the conduit 696 mix and enter cylinder head cooling water passages to cool the cylinder head 122. A water outlet 698 (schematically shown in FIG. 20) is defined in the cylinder head 122 and is fluidly connected to a discharge passage 700 (schematically shown in FIG. 20) defined on the left side of the outboard engine assembly 100 to discharge the cooling water to an exterior of the outboard engine assembly 100. The exhaust water jacket 690 also surrounds a portion of the idle relief passage 236 for cooling the idle relief passage 236. It is contemplated that the cooling system 600 could differ from the one described above in other implementations, and could include, for example, closed circuits for cooling water to flow therein.

Modifications and improvements to the above-described implementations of the present technology may become apparent to those skilled in the art. The foregoing description is intended to be exemplary rather than limiting.

What is claimed is:

1. An outboard engine assembly for a watercraft comprising:

an engine unit including:

an engine unit housing, an internal combustion engine disposed in the engine unit housing, the engine defining at least one combustion chamber, an exhaust system having at least one exhaust outlet, the exhaust system fluidly communicating with the at least one combustion chamber for supplying exhaust gases from the at least one combustion chamber to an exterior of the outboard engine assembly via the at least one exhaust outlet, a gearcase connected to the engine unit housing, a control module connected to the engine for controlling at least one operating parameter of the outboard engine assembly, and a water sensor disposed at least in part in the exhaust system for detecting presence of water in the exhaust system, the water sensor being in communication with the control module;

at least one of a cooling water passage and an intermediate water conduit for supplying cooling water to at least one of:

an engine block of the internal combustion engine, a cylinder head of the internal combustion engine, the control module, a fuel injector assembly, a vapor separator assembly, and a power steering system, a cooling water conduit fluidly connected to the at least one of the cooling water passage and the intermediate water conduit for receiving cooling water from the at least one of the cooling water passage and the intermediate water conduit, the cooling water conduit having a cooling water conduit outlet fluidly communicating with the exhaust system, cooling water being supplied sequentially from the at least one of the cooling water passage and the intermediate water conduit to the cooling water conduit and from the cooling water conduit to the cooling water outlet for supplying water into the exhaust system at a position upstream of the at least one exhaust outlet, the cooling water conduit outlet being positioned such that cooling water exiting the cooling water conduit outlet flows across the water sensor, and a propulsion device operatively connected to the engine.

2. The outboard engine assembly of claim 1, wherein the at least one exhaust outlet fluidly communicates with the gearcase.

3. The outboard engine assembly of claim 2, wherein the at least one exhaust outlet is defined in the propulsion device.

4. The outboard engine assembly of claim 2, wherein the exhaust system defines a high rise exhaust passage, and the water sensor is disposed between the at least one exhaust outlet and an apex of the high rise exhaust passage.

5. The outboard engine assembly of claim 4, wherein the water sensor is disposed between the apex of the high rise exhaust passage and an outlet of the high rise exhaust passage.

6. The outboard engine assembly of claim 5, wherein:

the engine unit housing includes an outer housing and an inner housing disposed in the outer housing, and the inner housing defines the high rise exhaust passage, and the outboard engine assembly further comprises a cooling system including:

at least one water intake defined in the gearcase;

a water pump housed in at least one of the gearcase and the inner housing, the water pump having an inlet in fluid communication with the at least one water intake and an outlet; and the cooling water conduit being in fluid communication with the outlet of the water pump.

7. The outboard engine assembly of claim 6, wherein the at least one of the cooling water passage and the intermediate water conduit comprises cooling water passages supplying cooling water from the outlet of the water pump to at least one of the engine block of the internal combustion engine and the cylinder head of the internal combustion engine.

8. The outboard engine assembly of claim 6, wherein the at least one of the cooling water passage and the intermediate water conduit comprises intermediate cooling water conduits in fluid communication with the outlet of the pump for providing cooling water to at least one of the control module, the fuel injector assembly, the vapor separator assembly and the power steering system of the outboard engine assembly before supplying cooling water to the cooling water conduit and then to the cooling water conduit outlet.

9. The outboard engine assembly of claim 6, wherein the cooling system further comprises an exhaust water jacket defined in the inner housing and being in fluid communication with the outlet of the water pump, the exhaust water jacket surrounding at least a portion of the high rise exhaust passage.

10. The outboard engine assembly of claim 6, wherein the inner housing forms a pocket in the high rise exhaust passage, the inner housing further forms a sensor passage, the sensor passage communicates with the pocket, and the water sensor extends at least partially in the sensor passage.

11. The outboard engine assembly of claim 10, wherein the cooling water conduit outlet is defined within the pocket, and the cooling water exiting the cooling water conduit outlet flows in the pocket between the water sensor and the high rise exhaust passage.

12. The outboard engine assembly of claim 11, wherein the pocket defines a first outlet disposed above the cooling water conduit outlet, and a second outlet disposed below the cooling water conduit outlet, the water sensor being disposed below the first outlet.

13. The outboard engine assembly of claim 1, wherein the water sensor is disposed above the cooling water conduit outlet; and the water conduit outlet is disposed above the at least one exhaust outlet.

14. The outboard engine assembly of claim 1, wherein the exhaust system defines a high rise exhaust passage communicating with the gearcase, the water sensor being disposed between the at least one exhaust outlet and an apex of the high rise exhaust passage, and the cooling water exiting the cooling water conduit flowing into the high rise exhaust passage and then to the at least one exhaust outlet.

15. The outboard engine assembly of claim 14, further comprising a cooling system including:

at least one water intake defined in the gearcase;

a water pump housed in at least one of the gearcase and the engine unit housing, the water pump having an inlet in fluid communication with the at least one water intake and an outlet; and the cooling water conduit being in fluid communication with the outlet of the water pump.

16. The outboard engine assembly of claim 14, wherein a pocket is formed in the high rise exhaust passage, the pocket defining a sensor passage, and the water sensor extends at least partially in the sensor passage.

17. The outboard engine assembly of claim 16, wherein the pocket defines a first outlet disposed above the water sensor and a second outlet disposed below the water sensor.

18. The outboard engine assembly of claim 1, wherein the internal combustion engine further comprises a crankshaft defining a crankshaft axis, the water sensor being disposed above the crankshaft axis.

19. The outboard engine assembly of claim 18, wherein the water sensor defines a water sensor axis, the water sensor axis being substantially parallel to the crankshaft axis.

20. The outboard engine assembly of claim 1, further comprising a transom bracket connected to the engine unit housing; and wherein:

the transom bracket defines a tilt-trim axis; and a center of mass of the engine is disposed below the tilt-trim axis at least when the outboard engine assembly is in a trim range.

* * * * *